United States Patent
Chan et al.

(10) Patent No.: US 10,926,316 B2
(45) Date of Patent: Feb. 23, 2021

(54) COLLAR POSITIONING SYSTEM

(71) Applicant: The Boeing Company, Chicago, IL (US)

(72) Inventors: Kwok Tung Chan, Seattle, WA (US); Tanni Sisco, Mukilteo, WA (US); Eric M. Reid, Kenmore, WA (US); Jeffrey Martin Devlin, Seattle, WA (US); Skye Sutherland Jenkins, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/923,297

(22) Filed: Mar. 16, 2018

(65) Prior Publication Data

US 2019/0283113 A1 Sep. 19, 2019

(51) Int. Cl.
*B21J 15/02* (2006.01)
*B21J 15/14* (2006.01)
(Continued)

(52) U.S. Cl.
CPC .............. *B21J 15/28* (2013.01); *B21J 15/022* (2013.01); *B64F 5/10* (2017.01); *F16B 5/0258* (2013.01);
(Continued)

(58) Field of Classification Search
CPC ....... B23P 19/001; B23P 19/006; B23P 19/06; B23P 19/08; B23P 19/10; B21J 15/022;
(Continued)

(56) References Cited

U.S. PATENT DOCUMENTS 3,575,364 A 4/1971 Frederick
5,146,773 A 6/1992 Rosier
(Continued)

FOREIGN PATENT DOCUMENTS

DE 202008014886 U1 4/2010
EP 1563950 A1 8/2005
(Continued)

OTHER PUBLICATIONS

Zieve et al., "Rivet Gripper and Offset Collar Gripper for Wing Panel Riveting," Society of Automotive Engineers, Inc., copyright 1999, 10 pages. https://www.electroimpact.com/WhitePapers/1999-01-3430.pdf.
(Continued)

*Primary Examiner* — Christopher J Besler
(74) *Attorney, Agent, or Firm* — Yee & Associates, P.C.

(57) ABSTRACT

A method and system for installing a fastener system. A collar in the fastener system is automatically positioned on a hole on a first side of a structure prior to an insertion of a pin in the fastener system into the hole from a second side of the structure in which the pin has a pin tail. The pin with the pin tail is inserted through the collar in which the pin extends through the hole and the collar. A force is applied on at least one of the collar or the pin tail along a centerline extending centrally though the collar until the pin tail becomes separated from the pin such that the collar engages an engagement feature on the pin when the pin with pin tail is inserted into the hole from the second side.

20 Claims, 33 Drawing Sheets

(51) Int. Cl.
  *F16B 19/05* (2006.01)
  *B21J 15/28* (2006.01)
  *B64F 5/10* (2017.01)
  *F16B 5/02* (2006.01)
  *F16B 5/04* (2006.01)

(52) U.S. Cl.
  CPC ............... *B21J 15/142* (2013.01); *F16B 5/04* (2013.01); *F16B 19/05* (2013.01)

(58) Field of Classification Search
  CPC ..... B21J 15/142; F16B 4/0004; F16B 5/0088; F16B 5/0258; F16B 19/05
  See application file for complete search history.

(56) References Cited

U.S. PATENT DOCUMENTS

| | | | |
|---|---|---|---|
| 5,687,463 | A | 11/1997 | Michalewski et al. |
| 6,073,326 | A | 6/2000 | Banks et al. |
| 6,098,260 | A | 8/2000 | Sarh |
| 6,446,330 | B2* | 9/2002 | Zieve ................... B21J 15/022 29/788 |
| 6,843,328 | B2 | 1/2005 | Boyl-Davis et al. |
| 7,488,144 | B2 | 2/2009 | Boyl-Davis et al. |
| 7,794,183 | B2 | 9/2010 | Wright et al. |
| 9,987,714 | B2 | 6/2018 | Henderson et al. |
| 10,213,823 | B2 | 2/2019 | Oberoi et al. |
| 2008/0181733 | A1 | 7/2008 | Wright et al. |
| 2012/0155988 | A1* | 6/2012 | Schumacher ........... F16B 33/06 411/369 |
| 2015/0211568 | A1* | 7/2015 | Corbett ................... F16B 35/04 411/366.3 |
| 2015/0224612 | A1 | 8/2015 | Henderson et al. |
| 2016/0009422 | A1 | 1/2016 | Oberoi et al. |
| 2016/0167109 | A1* | 6/2016 | Hauw ................... B21J 15/022 29/517 |
| 2017/0216981 | A1* | 8/2017 | Lee ........................... B25J 13/08 |
| 2018/0148196 | A1 | 5/2018 | Chan, Jr. et al. |

FOREIGN PATENT DOCUMENTS

| | | |
|---|---|---|
| EP | 2682565 A1 | 1/2014 |
| EP | 1463605 B1 | 2/2016 |
| WO | WO2010019320 A1 | 2/2010 |

OTHER PUBLICATIONS

Chan, Jr. et al., "Automated Fastening Machine Using a Compound Contour Vacuum Track for Automation of Final Assembly from the Interior of a Fuselage," U.S. Appl. No. 15/365,441, filed Nov. 30, 2016, 58 pages.

Chan, Jr. et al., "Compound Contour Vacuum Track for Automation of Final Assembly from the Interior of a Fuselage," U.S. Appl. No. 15/365,426, filed Nov. 30, 2016, 58 pages.

Extended European Search Report, dated Jan. 26, 2018, regarding Application No. EP17204696.3, 11 pages.

Chan et al., "Offset Fastener Installation System," U.S. Appl. No. 15/923,378, filed Mar. 16, 2018, 100 pages.

Extended European Search Report, dated Oct. 1, 2019, regarding Application No. 19155763.6, 8 pages.

Office Action dated Mar. 3, 2020 regarding U.S. Appl. No. 15/923,378; 29 pages.

Notice of Allowance dated Aug. 31, 2020, regarding U.S. Appl. No. 15/923,378, 17 pages.

\* cited by examiner

COLLAR POSITIONING SYSTEM

CROSS-REFERENCE TO RELATED APPLICATION

This application is related to U.S. Ser. No. 15/923,378, now U.S. Pat. No. 10,821,496 issued on Nov. 3, 2020, entitled "Offset Fastener Installation System", filed on Mar. 16, 2018, which is incorporated herein by reference in its entirety.

BACKGROUND INFORMATION

1. Field

The present disclosure relates generally to a manufacturing system and, in particular, to a method, an apparatus, and a system for installing fastener systems. Still more particularly, the present disclosure provides an automated method, apparatus, and system for installing fastener systems in aircraft structures.

2. Background

Manufacturing an aircraft can involve assembling large numbers of components to form the aircraft. For example, an aircraft in the form of a midsize commercial jetliner may have millions of parts that are manufactured and assembled to form the jetliner.

Assembling parts into structures that include assemblies and subassemblies may be performed using fastener systems. Factory level automation for aircraft assembly includes the automated drilling of holes and insertion of fasteners. For example, the joining of different sections of a fuselage for an aircraft may be automated utilizing equipment such as robots and flex track crawlers.

The fuselage of an aircraft may comprise a monocoque or semi-monocoque shell in which a series of hoop-wise frames in the shape of the fuselage cross sections are attached to longitudinal stringers. This structure is covered with a skin material. Most modern large aircraft use several large sections, which are then joined by fastening, riveting, or bonding to form the complete fuselage for the aircraft.

The number of fastener systems needed to assemble aircraft can be astronomical. For example, a midsize commercial jetliner can have several million fastener systems that are installed to join different parts together.

With this large number of fastener systems, the time needed to install the fasteners can be greater than desired. Also, the different geometries of parts, assemblies, subassemblies, and other structures for the aircraft may result in immediate access with respect to equipment used to automate installation of fastener systems. Further, accuracy in the orientation of holes for the fastener systems also may increase the difficulty in automating the installation of fastener systems.

Fastener hole, even those drilled with automated machinery, are often not perfectly normal with the surface being drilled through for the holes. These holes may be within tolerance and perfectly acceptable for manufacturing use. However, due to angularity of the inserted fastener, a significant lateral deviation of an insertion of the end of the fastener relative to the hole can be present.

The lateral deviation is a function of the angle off of normal of the bolt and the length that the bolt extends beyond the hole. This lateral deviation can be difficult to quickly and automatically compensate for when automating the installation of collars to bolts, especially when space is limited by overhanging structure.

For example, as a bolt in a hole is farther away from normal with the surface than a set tolerance, automated equipment can be unable to successfully move the collar to receive the bolt on an inner mold line side of the structure. As a result, the use of automated equipment may be limited requiring human operators to manually install fastener systems in some holes, or the automated equipment may take more time than desired to install the fasteners systems.

Therefore, it would be desirable to have a method and apparatus that take into account at least some of the issues discussed above, as well as other possible issues. For example, it would be desirable to have a method and apparatus that overcome a technical problem with automating the installation of fastener systems.

SUMMARY

An embodiment of the present disclosure provides a method for installing a fastener system. A collar in the fastener system is automatically positioned on a hole on a first side of a structure prior to an insertion of a pin in the fastener system into the hole from a second side of the structure in which the pin has a pin tail. The pin with the pin tail is inserted through the collar in which the pin extends through the hole and the collar. A force is applied on at least one of the collar or the pin tail along a centerline extending centrally though the collar until the pin tail becomes separated from the pin such that the collar engages an engagement feature on the pin when the pin with pin tail is inserted into the hole from the second side.

Another embodiment of the present disclosure provides a method for installing a fastener system. A collar is positioned relative to a hole on a first side of a structure. A pin with a pin tail is inserted through the hole and the collar from a second side of the structure in a single motion.

Another embodiment of the present disclosure provides a fastener installation system comprising a collar holder, a sensor system, a swage tool, and a controller. The collar holder is configured to hold a collar in a fastener system. The sensor system is configured to generate sensor data for a first side of a structure. The controller controls operation of the sensor system, the collar holder, and the swage tool in which the controller identifies a location of a hole in a first side of the structure using the sensor data. The controller automatically positions the collar held by the collar holder on the hole at the location by moving the collar holder. The controller applies a force using the swage tool on at least one of the collar or a pin tail along a centerline extending centrally though the collar until the pin tail becomes separated from the pin such that the collar engages an engagement feature on the pin when the pin with the pin tail is inserted into the hole from the second side.

Yet another embodiment of the present disclosure provides a method for installing a fastener in a structure. A collar is positioned on a hole on an inner mold line side of the structure prior to an insertion of a pin into the hole from the outer mold line side by holding the collar in a collar holder in a swage assembly; normalizing the collar to the inner mold line side; identifying a location of the hole on the inner mold line side using a sensor system; and moving the collar onto the hole at the location on the inner mold line side of the structure using the swage assembly prior to the insertion of the pin into the hole from the outer mold line side in which the collar is concentrically aligned with the hole. A force is applied on at least one of the collar or the pin tail along a centerline extending centrally though the collar until the pin tail becomes separated from the pin such that the collar engages an engagement feature on the pin when the pin with the pin tail is inserted into the collar and the hole from the outer mold line side.

Still another embodiment of the present disclosure provides a collar fastening system comprised of a platform, a sensor system connected to the platform, a swage assembly connected to the platform, and a controller that controls operation of the swage assembly. The controller controls the swage assembly to position a collar on a hole on an inner mold line side of a structure such that the collar is concentrically aligned with the hole prior to an insertion of a pin into the hole from an outer mold line; controls the swage assembly to normalize the collar to the inner mold line side; identifies a location of the hole on the inner mold line side using sensor data from the sensor system; controls the swage assembly to move the collar onto the hole at the location on the inner mold line side of the structure using the swage assembly prior to the insertion of the pin into the hole from the outer mold line side; and controls the swage assembly to apply a force on at least one of the collar or the pin tail along a centerline extending centrally though the collar until the pin tail becomes separated from the pin such that the collar engages an engagement feature on the pin when the pin with the pin tail is inserted into the collar and the hole from the outer mold line side.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
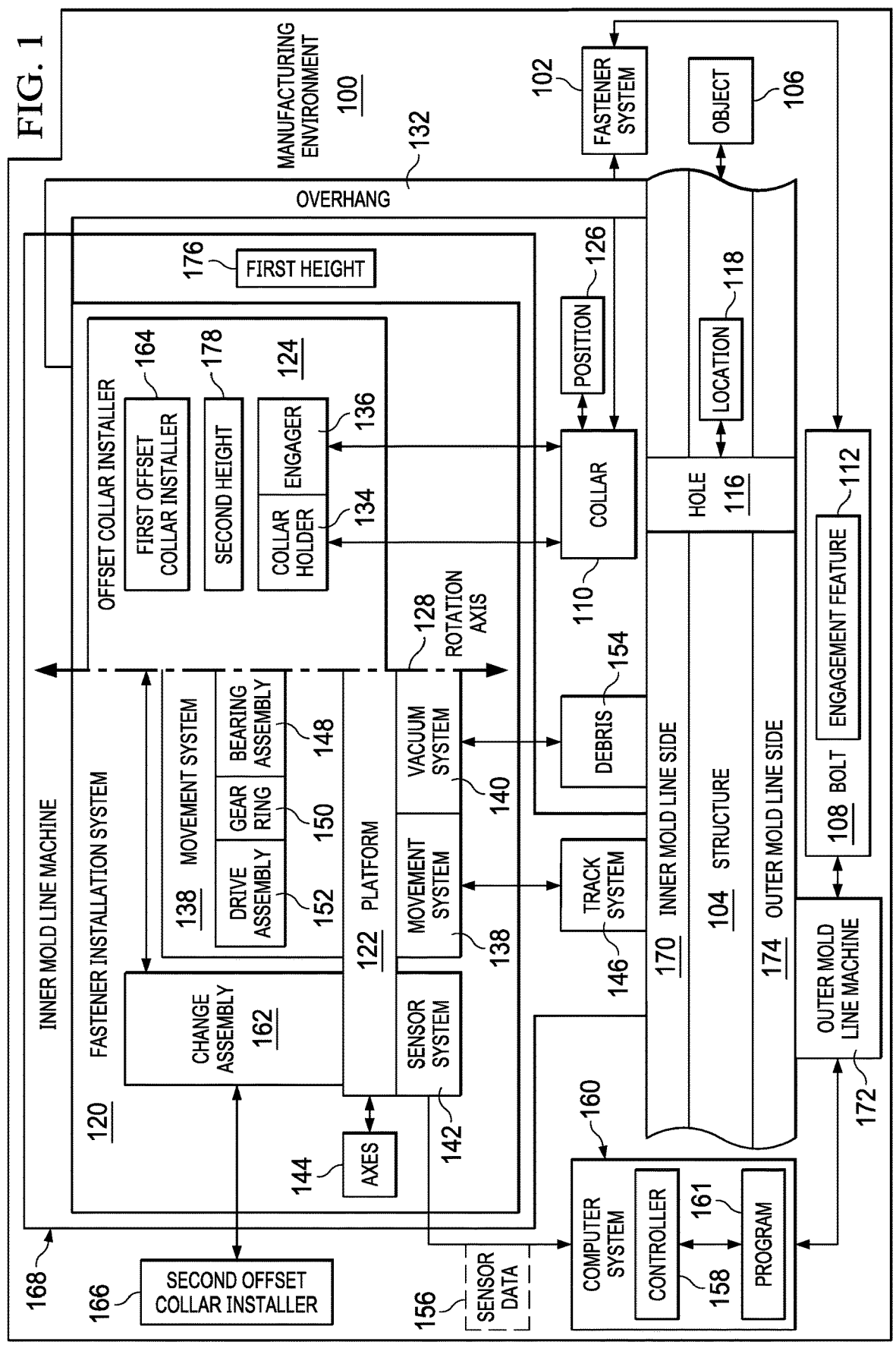
FIG. 1 is an illustration of a block diagram of a manufacturing environment in which a fastener installation system installs fastener systems in accordance with an illustrative embodiment.

The illustrative embodiments recognize and take into account one or more different considerations. For example, the illustrative embodiments recognize and take into account that fastener systems may be installed in holes located under overhangs in a structure. The illustrative embodiments recognize and take into account that the height of currently available fastener installation systems may be unable to install a fastener system in a hole under an overhang on the structure. For example, automatically installing collars in these areas may be more difficult than desired using currently available fastener installation systems. The illustrative embodiments recognize and take into account that the height of the fastener installation system may be too tall to fit under some overhangs. For example, structures with overhangs may include a fuselage frame and other structures in the interior of the structures that may have restrictive structures that make automated installation of fasteners more difficult than desired. For example, installing collars to the end of bolts on the interior of the fuselage may not be automatically performed using currently available fastener installation systems.

Thus, the illustrative embodiments provide a method, an apparatus, and a system for installing fastener systems. In one illustrative example, a fastener installation system comprises a platform and an offset collar installer. The platform is configured to be movably positioned on a structure. The offset collar installer is connected to the platform.

When one component is "connected" with another component, the connection is a physical association. For example, a first component, such as an offset collar installer, may be considered to be physically connected to a second component, such as a platform, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically connected to the second component by being formed as part of the second component, an extension of the second component, or both.

In the illustrative example, the offset collar installer holds a collar for installation in a position offset from a rotation axis and fastens the collar to a bolt with engagement features. The offset collar installer rotates about the rotation axis to swings into the position.

Further, the illustrative embodiments recognize and take into account that the orientation of the holes or the manner in which bolts are inserted into holes may result in collars that are not normal to the surface of a structure but within tolerance when the collars are installed. In other words, an axis extending centrally through the hole is not normal to the surface of the structure. For example, a centerline through a hole can be off angle from perpendicular to the inner mold line surface. This situation can be induced by outer mold line drill or by design specification. The illustrative embodiments recognize and take into account that a collar can be positioned off angle from the inner mold line surface up to 5 degrees and still meet structure requirements. Those embodiments also recognize and take account that the collar orientation is sensitive with a single flange type collar in which the flange contacts the inner mold line surface. The swage tool can perform off angle swage (less than 3 degree) and still meet requirements.

The illustrative embodiments recognize and take into account that currently a bolt in the form of a pin in the fastener system is inserted from the outer mold line side of the structure and extends through the hole onto the inner mold line side of the structure until the pin is fully seated.

The illustrative embodiments recognize and take into account that a collar in the fastener system is moved towards the end of the pin on the inner mold line side such that the pin is received through a hole in the collar. The collar is swaged to engage engagement features on the pin.

The illustrative embodiments recognize and take into account that when the bolt is not normal to the inner mold line surface, installing a fastener system can be more difficult while utilizing automated equipment. The illustrative embodiments recognize and take into account that if the bolt is farther away from normal than a set tolerance, the automated equipment is unable to successfully move the collar to receive the pin on the inner mold line side of the structure.

Thus, the illustrative embodiments provide a method, an apparatus, and a system for installing a fastener system such as a collar and a pin. In one illustrative example, a method is present for installing a fastener system. The process positions a collar in the fastener system on a hole on an inner mold line side of a workpiece prior to insertion of a pin in the fastener system into the hole from the outer mold line side. The process swages the collar such that the collar engages locking features on the pin when the pin is inserted into the hole from the outer mold line side.

With reference now to the figures and, in particular, with reference to FIG. 1, an illustration of a block diagram of a manufacturing environment in which a fastener installation system installs fastener systems is depicted in accordance with an illustrative embodiment. In this illustrative example, manufacturing environment 100 is an environment in which fastener system 102 can be installed in structure 104 for object 106 by fastener installation system 120.

Fastener system 102 includes bolt 108 and collar 110. In this illustrative example, bolt 108 can be selected from a group comprising a pin, the pin with a pin-tail, a threaded bolt, and a lock bolt.

As depicted, bolt 108 includes engagement feature 112. Engagement feature 112 can be, for example, a thread, a set of protrusions, a set of grooves, a flange, a set of annular grooves, or some other suitable type of feature that can be engaged by collar 110 and fasten collar 110 and bolt 108 to each other. Collar 110 can be selected from a group comprising a flanged collar, a threaded collar, a nut, and some other suitable structure that is configured to receive and be fastened to bolt 108.

Structure 104 can take a number of different forms. For example, structure 104 can be selected from a group comprising an assembly, a sub-assembly, a fuselage section, a wing, a wing box, a horizontal stabilizer, a landing gear system, a hydraulic system, a skin panel, a stringer, a fuselage section, a composite fuselage section, a support structure with a frame overhang, and some other structure in which fastener system 102 can be installed to join two components to each other in structure 104.

Object 106 may take a number of different forms. For example, object 106 may be, for example, a mobile platform, a stationary platform, a land-based structure, an aquatic-based structure, and a space-based structure. More specifically, object 106 can be a surface ship, an aircraft, a tank, a personnel carrier, a train, a spacecraft, a space station, a satellite, a submarine, an automobile, a power plant, a bridge, a dam, a house, a manufacturing facility, a building, and other suitable types of objects.

As depicted, structure 104 includes hole 116 at location 118. In this illustrative example, fastener installation system 120 is configured to install fastener system 102 in hole 116. In this illustrative example, fastener installation system 120 comprises platform 122 and offset collar installer 124.

During operation of fastener installation system 120, platform 122 is configured to be movably positioned on structure 104. Offset collar installer 124 is connected to platform 122. Offset collar installer 124 can hold collar 110 for installation in position 126 offset from rotation axis 128 and can fasten collar 110 to bolt 108 with engagement feature 112. As depicted, offset collar installer 124 can swing into position 126 offset from rotation axis 128. For example, offset collar installer 124 can rotate about rotation axis 128 to into position 126 offset from rotation axis 128 to install fastener system 102 in hole 116.

In this illustrative example, overhang 132 may be such that all of fastener installation system 120 cannot move on structure 104 to fit under overhang 132. As depicted, offset collar installer 124 is configured to rotate around rotation axis 128 into position 126 offset in a manner that allows offset collar installer 124 to fit under overhang 132 such that collar 110 can be positioned and fastened to bolt 108 in hole 116. In other words, a portion of offset collar installer 124 can fit under overhang 132 or other restricted areas where other currently available collar installers in automated collar installation systems cannot fit.

In the illustrative example, fastener installation system 120 comprises collar holder 134 and engager 136. As depicted, collar holder 134 is configured to hold collar 110 in position 126 to receive bolt 108. In this example, collar 110 is stationary while bolt 108 moves through hole 116. In another illustrative example, bolt 108 is stationary in hole 116 while collar 110 moves towards hole 116 to receive bolt 108.

Engager 136 configured to fasten collar 110 to bolt 108. For example, engager 136 may swage collar 110 to bolt 108 such that collar 110 is fastened to bolt 108. In another illustrative example, engager 136 can rotate collar 110 relative to bolt 108 to fasten collar 110 to bolt 108. As depicted, collar holder 134 and engager 136 form offset collar installer 124.

In this illustrative example, fastener installation system 120 includes a number of other components. For example, fastener installation system 120 also includes movement system 138, vacuum system 140, and sensor system 142.

As depicted, movement system 138 is connected to platform 122. Movement system 138 can be configured to move at least one of platform 122 or offset collar installer 124.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

For example, movement system 138 is connected to offset collar installer 124 and is configured to move offset collar installer 124 around rotation axis 128. Further, movement system 138 is further configured to move platform 122 along axes 144 and in addition to moving offset collar installer 124 around rotation axis 128.

In one illustrative example, movement system 138 can be coupled to or placed on track system 146. As depicted, the movement along axes 144 can be relative to track system 146. Axes 144 can be, for example, two axes, three axes, or some other number of axes depending on the particular implementation. In this illustrative example, platform 122 is configured to move on track system 146, which is selected from at least one of a flexible track system, a dual track system, a flexible vacuum track system configured to be attached to structure 104, or some other suitable type.

In another illustrative example, movement system 138 can move offset collar installer 124 about rotation axis 128 using a number of different components. As depicted, these components in movement system 138 include bearing assembly 148, gear ring 150, and drive assembly 152.

As depicted, bearing assembly 148 is connected to offset collar installer 124. Bearing assembly 148 is configured to move around rotation axis 128. Gear ring 150 is connected to bearing assembly 148. Drive assembly 152 is moveably connected to gear ring 150. In this illustrative example, drive assembly 152 is configured to move gear ring 150. As a result, movement of drive assembly 152 moves bearing assembly 148 via gear ring 150.

In this illustrative example, vacuum system 140 is connected to platform 122. Vacuum system 140 is configured to remove debris 154 around hole 116. The debris can be, for example, particles generated from drilling hole 116. In another example, when bolt 108 takes the form of a pin with a pin tail, debris 154 can include the pin tail that separates from the pin after swaging the collar to the pin. For example, when bolt 108 is a pin with a pin tail, a pin tail deflector (not shown) can guide the pin tail to a port (not shown) in vacuum system 140 after the pin tail is separated from the pin.

In this illustrative example, sensor system 142 is also connected to platform 122. As depicted, sensor system 142 is a physical hardware system that detects information about the environment around fastener installation system 120.

Sensor system 142 is configured to generate sensor data 156. Sensor data 156 can include information about structure 104, a position of offset collar installer 124, a position of platform 122 relative to structure 104, an image of hole 116, and other information that can be used to control the operation of fastener installation system 120. Sensor system 142 can include at least one of a camera system, a laser sensor, an ultrasonic sensor, a light detection and ranging scanner, or some other suitable type of sensor.

Sensor data 156 is sent to controller 158 located in computer system 160. Controller 158 can be implemented in at least one of software or hardware. When software is used, the operations performed by controller 158 may be implemented in program code configured to run on hardware, such as a processor unit. When firmware is used, the operations performed by controller 158 may be implemented in program code and data and stored in persistent memory to run on a processor unit. When hardware is employed, the hardware may include circuits that operate to perform the operations in controller 158.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 160 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Controller 158 controls the operation of fastener installation system 120 utilizing program 161. Program 161 may be, for example, a computer numerical control (CNC) program or some other suitable program code that may be used to control the operation of fastener installation system 120. For example, fastener installation system 120 can be a computer numerical control (CNC) machine which uses cartesian coordinates.

Controller 158 can utilize sensor data 156 to control the operation of different components in fastener installation system 120. Although shown as a separate component, controller 158 and computer system 160 may be located on or in platform 122 in some illustrative examples.

Further, fastener installation system 120 can also include change assembly 162 that is connected to platform 122. In this example, offset collar installer 124 is first offset collar installer 164 and is connected to platform 122 indirectly through a connection to change assembly 162. First offset collar installer 164 is removably connected to change assembly 162. As a result, first offset collar installer 164 can be replaceable with second offset collar installer 164 without utilizing a tool (not shown). Different offset collar installers may be configured to install at least one of different sizes or different configurations of fastener systems. In other words, a quick change can be made between offset collar installers to install fastener systems of different sizes.

Further, platform 122, offset collar installer 124, movement system 138, vacuum system 140, and sensor system 142 form an inner mold line machine 168 located on inner mold line side 170 of structure 104 in this illustrative example. Further, fastener installation system 120 also can include outer mold line machine 172 configured to insert bolt 108, such as a pin, through hole 116 from outer mold line side 174 of structure 104. In this illustrative example, outer mold line machine 172 also can be controlled by controller 158 in computer system 160 to perform a coordinated installation of fastener system 102 in hole 116 in structure 104.

In one illustrative example, one or more technical solutions are present that overcome a technical problem with installing fastener systems in structure 104 that has overhang 132 wherein hole 116 is to be installed. In the illustrative example, first height 176 for inner mold line machine 168 can be great enough that inner mold line machine 168 is unable to fit under overhang 132.

As a result, one or more technical solutions may provide a technical effect configuring offset collar installer 124 such that offset collar installer 124 moves around rotation axis 128 for platform 122. Offset collar installer 124 has second height 178 that is less than first height 176. Further, second height 178 is such that offset collar installer 124 can swing around rotation axis 128 to hole 116 located under overhang 132. In other words, offset collar installer 124 has second height 178 that is low enough to allow offset collar installer 124 to swing or rotate into place to position collar 110 over hole 116 and fasten collar 110 to bolt 108 located in hole 116. As a result, fastener installation system 120 can install fastener system 102 in a manner that avoids current issues with fastener installation systems with respect to overhang 132.

Figure 2:
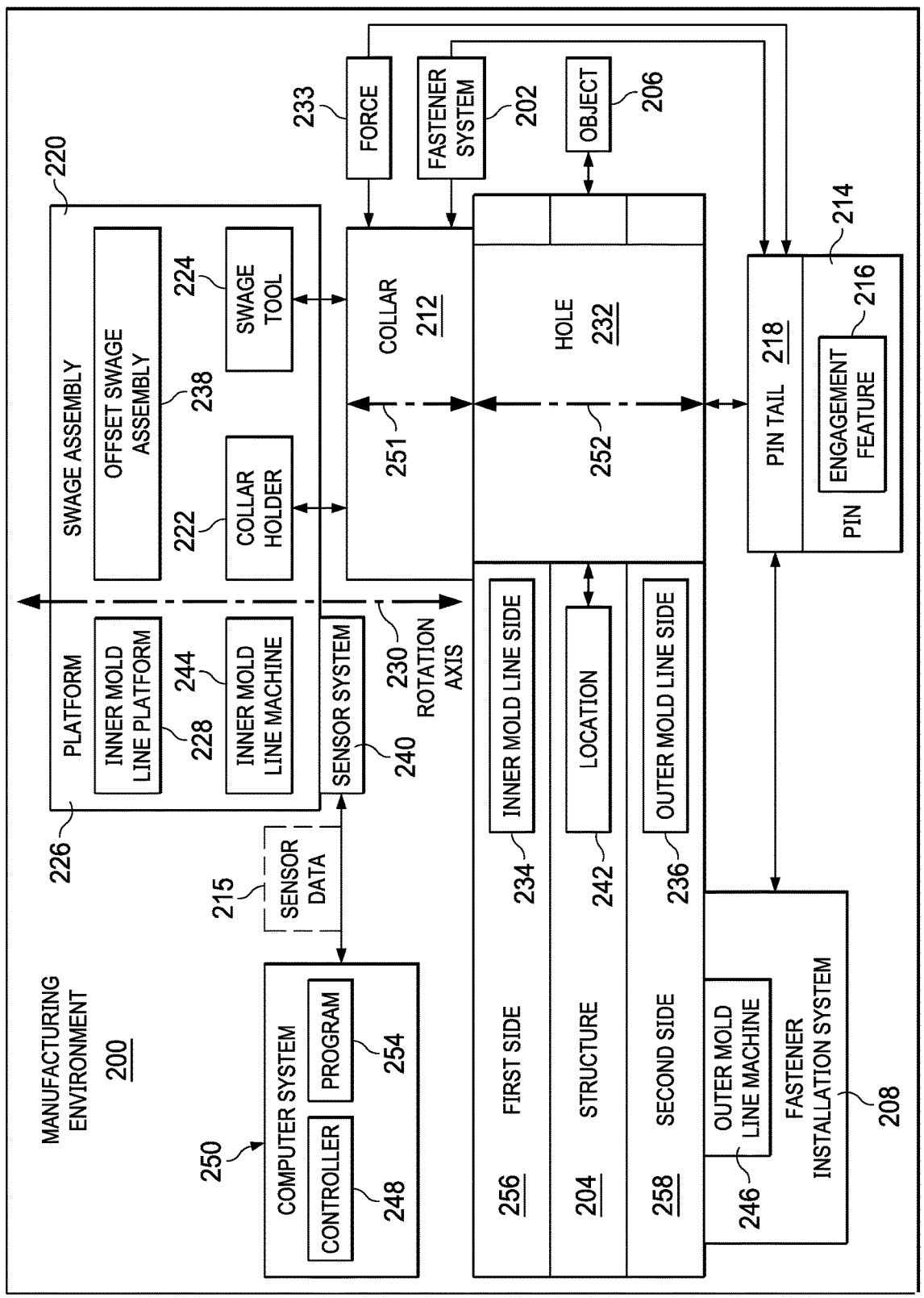
FIG. 2 is an illustration of a block diagram of a manufacturing environment in which a fastener system is installed in accordance with an illustrative embodiment.

With reference next to FIG. 2, an illustration of a block diagram of a manufacturing environment in which a fastener system is installed is depicted in accordance with an illustrative embodiment. Manufacturing environment 200 is an environment in which fastener system 202 can be installed in structure 204 for object 206 utilizing fastener installation system 208. Structure 204 and object 206 may take various forms similar to the forms described with respect to structure 104 and object 106 in FIG. 1. Structure 204 can be, for example, without limitation, comprising a metal structure, composite structure, a metal and composite work piece, a splice, a butt splice, a splice for two fuselage sections, or some other suitable structure.

As depicted, fastener system 202 comprises pin 214 and collar 212. In this illustrative example, collar 212 can be swaged to pin 214. In other words, collar 212 can be deformed to engage engagement feature 216 on pin 214. Pin 214 also may include pin tail 218. In this illustrative example, engagement feature 216 may be, for example, a thread, a set of protrusions, a set of grooves, a flange, or some other suitable type of feature that can be engaged by collar 212 and fasten collar 212 to pin 214.

As depicted, fastener installation system 208 comprises swage assembly 220, which is configured to cause collar 212 to engage with pin 214. In this illustrative example, swage assembly 220 is an example of offset collar installer 124 in FIG. 1 and comprises collar holder 222 and swage tool 224. Collar holder 222 is configured to hold collar 212. Swage tool 224 is configured to cause collar 212 to engage engagement feature 216 on pin 214. In this example, pin 214 and pin tail 218 are inserted into collar 212. In other words, pin 214 and pin tail 218 are moved through collar 212 after collar 212 has been positioned on hole 232.

Pin tail 218 is a component connected to pin 214. In this particular example, swage tool 224 engages pin tail 218 and pulls pin 214 through collar 212 in a manner that causes collar 212 to deform in a manner that engages engagement feature 216. Engagement feature 216 is a feature on pin 214 and not pin tail 218. Engagement feature 216 can be at least one of a set of threads, a set of grooves, a set of annular grooves, or other types of features to which collar 212 can be swaged to engage pin 214.

In the illustrative example, causing collar 212 to engage engagement feature 216 can be performed any number of different ways. For example, force 233 can be applied on at least one of collar 212 or pin tail 218 along centerline 251 extending centrally though collar 212 until pin tail 218 become separated from pin 214 such that collar 212 engages engagement feature 216 on pin 214 when pin 214 with pin tail 218 is inserted into hole 232 from second side 258. In other words, force 233 can be applied to one or both of collar 212 or pin tail 218 causing collar 212 to be swaged such that collar 212 engages engagement feature 216 on pin 214.

In this illustrative example, swage assembly 220 can be offset collar installer 124 in FIG. 1. Collar holder 222 can be an example of collar holder 134 in FIG. 1 and swage tool 224 can be an example of engager 136 in FIG. 1.

As depicted, swage assembly 220 is connected to platform 226. In this illustrative example, platform 226 takes the form of inner mold line platform 228. In this illustrative example, inner mold line platform 228 can be selected from a group comprising a flex track crawler, a robotic arm, and some other suitable type of platform.

In one example, swage assembly 220 is offset swage assembly 238 such that collar 212 is held offset from rotation axis 230 on which swage assembly 220 is located. Depending on the implementation, swage assembly 220 may or may not be offset from rotation axis 230. As depicted, collar holder 222 in swage assembly 220 is configured to position collar 212 on hole 232. In the illustrative example, the positioning is performed such that collar 212 is concentrically aligned with hole 232. For example, centerline 251 for collar 212 intercepts centerline 252 for hole 232.

In the illustrative examples, the positioning of collar 212 on hole 232 is performed such that collar 212 receives pin 214 when pin 214 is placed into hole 232 on inner mold line side 234 of structure 204 prior to insertion of pin 214 into hole 232 from outer mold line side 236. As depicted, pin 214 be moved in a single motion through hole 232 and collar 212.

When pin 214 is inserted into hole 232, outer mold line side 236 is moved to extend through collar 212, and swage assembly 220 swages collar 212 such that collar 212 engages engagement feature 216 on pin 214.

As depicted, positioning of collar 212 on hole 232 may result in collar 212 touching inner mold line side 234. In other illustrative examples, collar 212 may not touch inner mold line side 234 when being positioned on hole 232. In this example, swage tool 224 engages and pulls pin tail 218 such that pin tail 218 and pin 214 moves through collar 212 in a manner that causes collar 212 to swage to engage engagement feature 216 on pin 214.

In positioning collar 212 on hole 232 on first side 256 of structure 204 prior to insertion of pin 214 into hole 232 from second side 258, swage assembly 220 holds collar 212 in collar holder 222 in swage assembly 220 and moves collar 212 such that collar 212 is positioned on hole 232 on inner mold line side 234 of structure 204. In this illustrative example, first side 256 is inner mold line side 234 and second side 258 is outer mold line side 236.

In another example, in positioning collar 212 on hole 232 on inner mold line side 234 of structure 204 prior to insertion of pin 214 into hole 232 from outer mold line side 236, swage assembly 220 normalizes collar 212 to inner mold line side 234 and moves collar 212 onto hole 232 on inner mold line side 234 of structure 204 prior to insertion of pin 214 into hole 232 from outer mold line side 236. The normalization includes moving collar 212 about on one or more axes. This movement is performed in this example to provide concentricity between collar 212 and hole 232.

Further, fastener system 202 also may include sensor system 240 similar to sensor system 142 in FIG. 1. In positioning collar 212 on hole 232, sensor system 240 identifies location 242 of hole 232 on inner mold line side 234 and swage assembly 220 moves collar 212 onto hole 232 at location 242 on inner mold line side 234 of structure 204 prior to insertion of pin 214 into hole 232 from outer mold line side 236. As depicted, collar 212 is positioned such that concentricity is present between collar 212 and hole 232. This concentricity enables pin 214 to extend through collar 212 such that collar 212 can be fastened to pin 214.

In the illustrative example, sensor system 142 is a physical hardware system that detects information about the environment around fastener installation system 208. Sensor system 240 is configured to generate sensor data 215. Sensor system 240 can contain one or more types of sensors. For example, sensor system 240 can be selected from at least one of a camera system, a vision system, a laser range finder, or some other suitable type of sensor. Sensor data 215 generated by sensor system 240 can be used to perform alignment of collar 212 with hole 232. This alignment is performed to generate concentricity between collar 212 on hole 232 such that pin tail 218 and pin 214 can be inserted through hole 232 and extends through collar 212 in a desired manner.

In this illustrative example, swage assembly 220 and platform 226 form inner mold line machine 244. Further, fastener installation system 208 also includes outer mold line machine 246 in this illustrative example. Outer mold line machine 246 is configured to insert pin 214 through hole 232 from outer mold line side 236 of structure 204. As depicted, collar 212 is aligned with hole 232 on inner mold line side 234 prior to pin tail 218 and pin 214 being moved through hole 232 to extend though collar 212.

In this illustrative example, inner mold line machine 244 and outer mold line machine 246 can be controlled by controller 248 in computer system 250 to perform a coordinated installation of fastener system 202 in hole 232 in structure 204.

Sensor data 215 is sent to controller 248 located in computer system 250. Controller 248 can be implemented in at least one of software or hardware. When software is used, the operations performed by controller 248 may be implemented in program code configured to run on hardware, such as a processor unit. When firmware is used, the operations performed by controller 248 may be implemented in program code and data and stored in persistent memory to run on a processor unit. When hardware is employed, the hardware may include circuits that operate to perform the operations in controller 248.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 250 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Controller 248 controls the operation of fastener installation system 208 utilizing program 254. Program 254 may be, for example, a computer numerical control (CNC) program or some other suitable program code that may be used to control the operation of fastener installation system 208.

Controller 248 can utilize sensor data 215 to control the operation of different components in fastener installation system 208. Although shown as a separate component, controller 248 and computer system 250 may be located on or in platform 226 in some illustrative examples.

In one illustrative example, fastener installation system 208 comprises collar holder 222, sensor system 240, and controller 248. In this example, collar holder 222 is configured to hold collar 212 in fastener system 202. Sensor system 240 is configured to generate sensor data 215 for first side 256 of structure 204. As depicted in this example, controller 248 controls operation of sensor system 240 and collar holder 222. Controller 248 identifies location 242 of hole 232 in first side 256 of structure 204 using sensor data 215 and automatically positions collar 212 held by collar holder 222 on hole 232 at location 242 by moving collar holder 222.

In one illustrative example, one or more technical solutions are present that overcome a technical problem with automating the installation of fastener systems. Currently, when a hole deviates from normal, installing a fastener using current processes may be infeasible.

The illustrative embodiments recognize and take into account that currently employed machines such as those that move on rails attached to structure 204 may be unable to place collar 212 on pin 214 inserted into hole 232 depending on the how much hole 232 deviates from the normal of the surface of structure 204. For example, the illustrative embodiments recognize and take into account that with currently available fastener installation systems, the deviation of two degrees or more from normal (but within tolerance) can prevent current machines from placing collar 212 accurately for automated installation of fastener system 202.

The illustrative examples provide a technical solution in which collar 212 is positioned on hole 232 prior to pin 214 being inserted through hole 232 and collar 212. As a result, one or more technical solutions may provide a technical effect of enabling installing collars on pins in holes that may deviate from normal with respect to the surface of structure 204 even though the holes are still in tolerance.

As a result, a technical solution in the illustrative example may have a technical effect of decreasing cycle time and increasing positional accuracy when holes are angled rather than substantially normal to the surface of structure 204. In the illustrative example, collar 212 is positioned on structure 204 prior to inserting pin 214.

The illustrations of manufacturing environment 100 in FIG. 1 and manufacturing environment 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, offset collar installer 124, movement system 138, vacuum system 140, and sensor system 142 have been described as being capable of forming inner mold line machine 168 located on inner mold line side 170 of structure 104. In other illustrative examples, these components may be part of an outer mold line machine with the inner mold line machine inserting bolt 108 from inner mold line side 170 of structure 104. As another example, first side 256 could be outer mold line side 236 while second side 258 could be inner mold line side 234 in other implementations.

Figure 3:
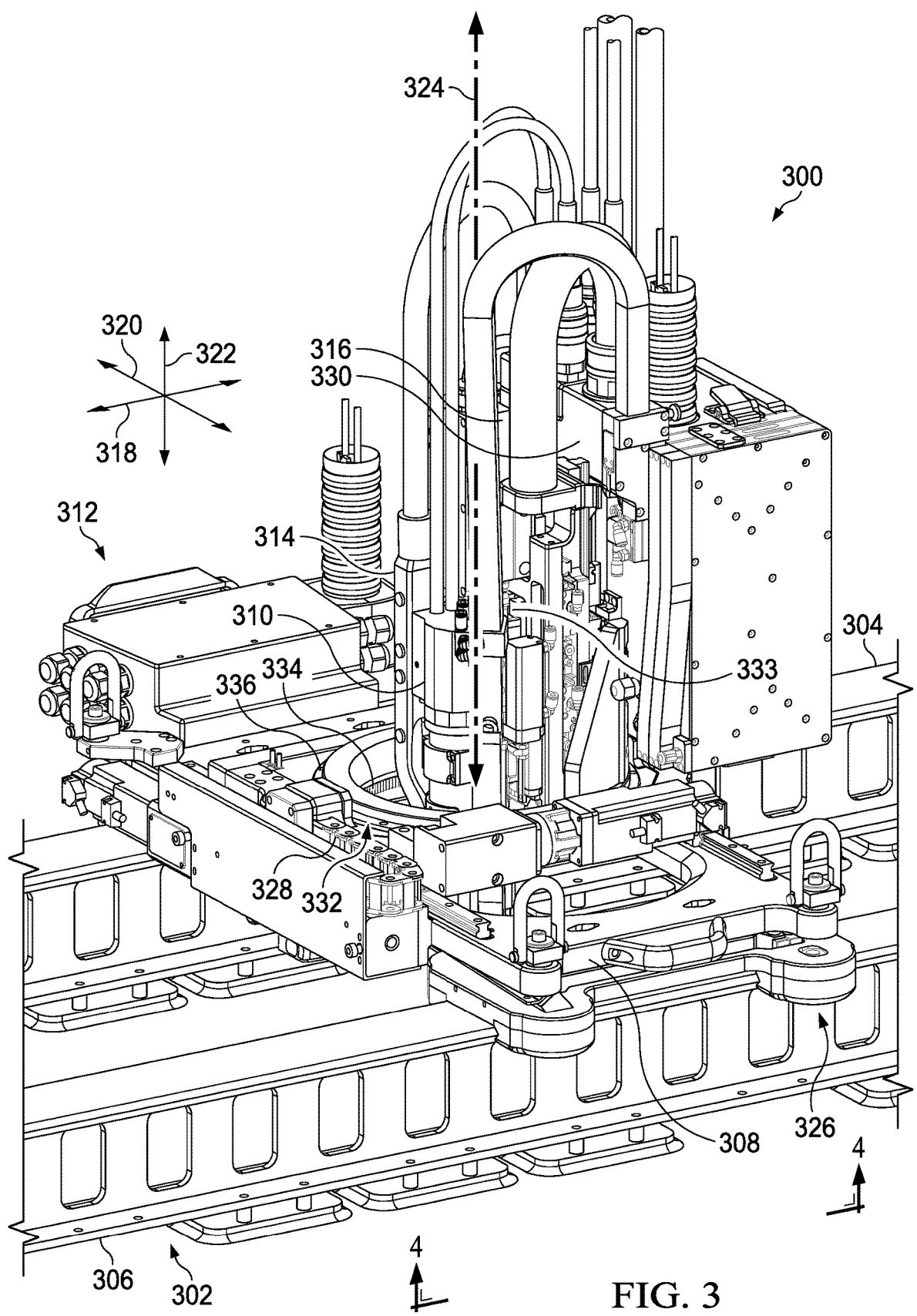
FIG. 3 is an illustration of an inner mold line machine in a fastener installation system in accordance with an illustrative embodiment.

With reference to FIG. 3, an illustration of inner mold line machine 300 in a fastener installation system is depicted in accordance with an illustrative embodiment. In this illustrative example, inner mold line machine 300 moves on track system 302. Track system 302 comprises first track 304 and second track 306.

As depicted, inner mold line machine 300 is an example of one implementation for inner mold line machine 168 in fastener installation system 120. As depicted, inner mold line machine 300 comprises platform 308, offset swage assembly 310, movement system 312, vacuum system 314, and camera 316. In this illustrative example, platform 308 is an example of one implementation for platform 122 shown in block form in FIG. 1. Offset swage assembly 310 is an example of an implementation for offset collar installer 124 depicted in block form in FIG. 1. Vacuum system 314 is an example of an implementation for vacuum system 140 shown in block form in FIG. 1. Camera 316 is an example of an implementation for sensor system 142 shown in block form in FIG. 1.

As depicted, movement system 312 is configured to move inner mold line machine 300 in a number of different directions. For example, movement system 312 is configured to move platform 308 in the direction of x-axis 318, y-axis 320, and z-axis 322.

Further, movement system 312 is also configured to move offset swage assembly 310 about rotation axis 324. In other words, movement system 312 can cause offset swage assembly 310 to swing around rotation axis 324. Rotation axis 324 is parallel to z-axis 322 in this illustrative example.

As depicted, motorized wheel system 326 is configured to move platform 308 along x-axis 318. Ball screw drive 328 is configured to move platform 308 along y-axis 320. Ball screw drive 330 is configured to move platform 308 along z-axis 322.

As depicted, movement system 312 is configured to move offset swage assembly 310 about rotation axis 324 with bearing assembly 332. In this view, gear ring 334 and outer ring 336 are seen in bearing assembly 332.

In this figure, offset swage assembly 310 is connected to gear ring 334 in bearing assembly 332. As depicted, gear ring 334 rotates about rotation axis 324 in this example. Outer ring 336 is connected to platform 308 and gear ring 334 is configured to rotate within outer ring 336. Further, vacuum system 314 and camera 316 are also connected to bearing assembly 332 such that these components also can be rotated about rotation axis 324. In this example, offset swage assembly 310 is removably attached to platform 308 by adapter 333.

Figure 4:
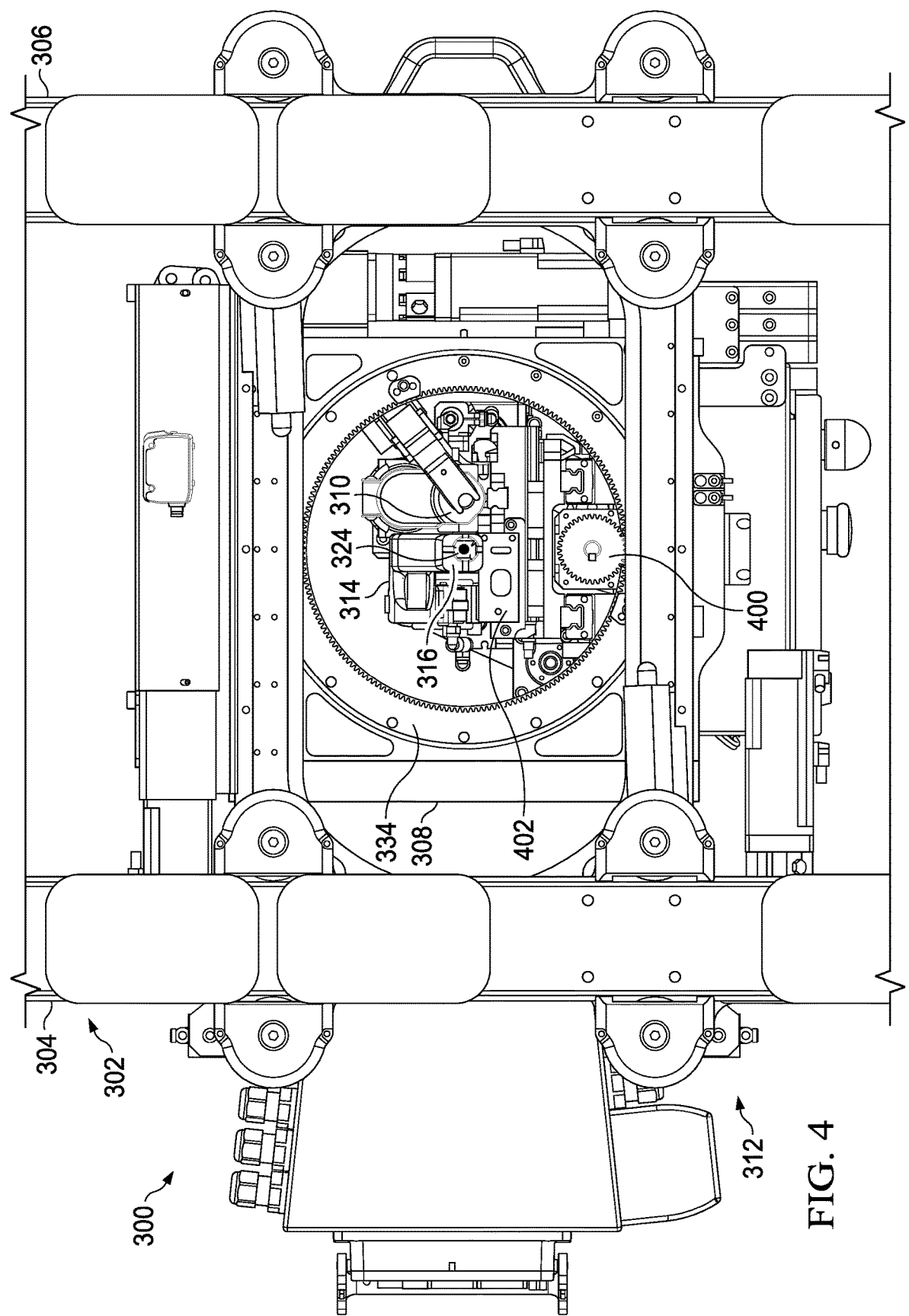
FIG. 4 is an illustration of a bottom view of an inner mold line machine in accordance with an illustrative embodiment.

With reference next to FIG. 4, an illustration of a bottom view of inner mold line machine 300 is depicted in accordance with an illustrative embodiment. In this example, inner mold line machine 300 as seen from a bottom view in the direction of lines 4-4 in FIG. 3.

As depicted in this example, movement system 312 is configured to move offset swage assembly 310 about rotation axis 324 with bearing assembly 332.

As depicted, gear ring 334 is connected to platform 308. As depicted, gear ring 334 is moveably connected to platform 308.

In this illustrative example, offset swage assembly 310, vacuum system 314, and camera 316 are shown as connected to gear ring 334. In other words, these components are configured to rotate around rotation axis 324 as gear ring 334 rotates about rotation axis 324. The different components may be directly or indirectly connected to gear ring 334.

As depicted, drive 400 is a motorized unit configured to cause offset swage assembly 310, vacuum system 314, and camera 316 to rotate around rotation axis 324 by moving gear ring 334.

In this illustrative example, laser sensor 402 is adjacent to camera 316. Laser sensor 402 detects the distance from laser sensor 402 to an inner mold line surface (not shown).

In this example, bearing assembly 332 with gear ring 334, outer ring 336, and drive 400 allows for 360 degrees of rotation of offset swage assembly 310, vacuum system 314, camera 316, and laser sensor 338 around rotation axis 324. In this manner, offset swage assembly 310 is configured to swing into a desired position offset from rotation axis 324.

Figure 5:
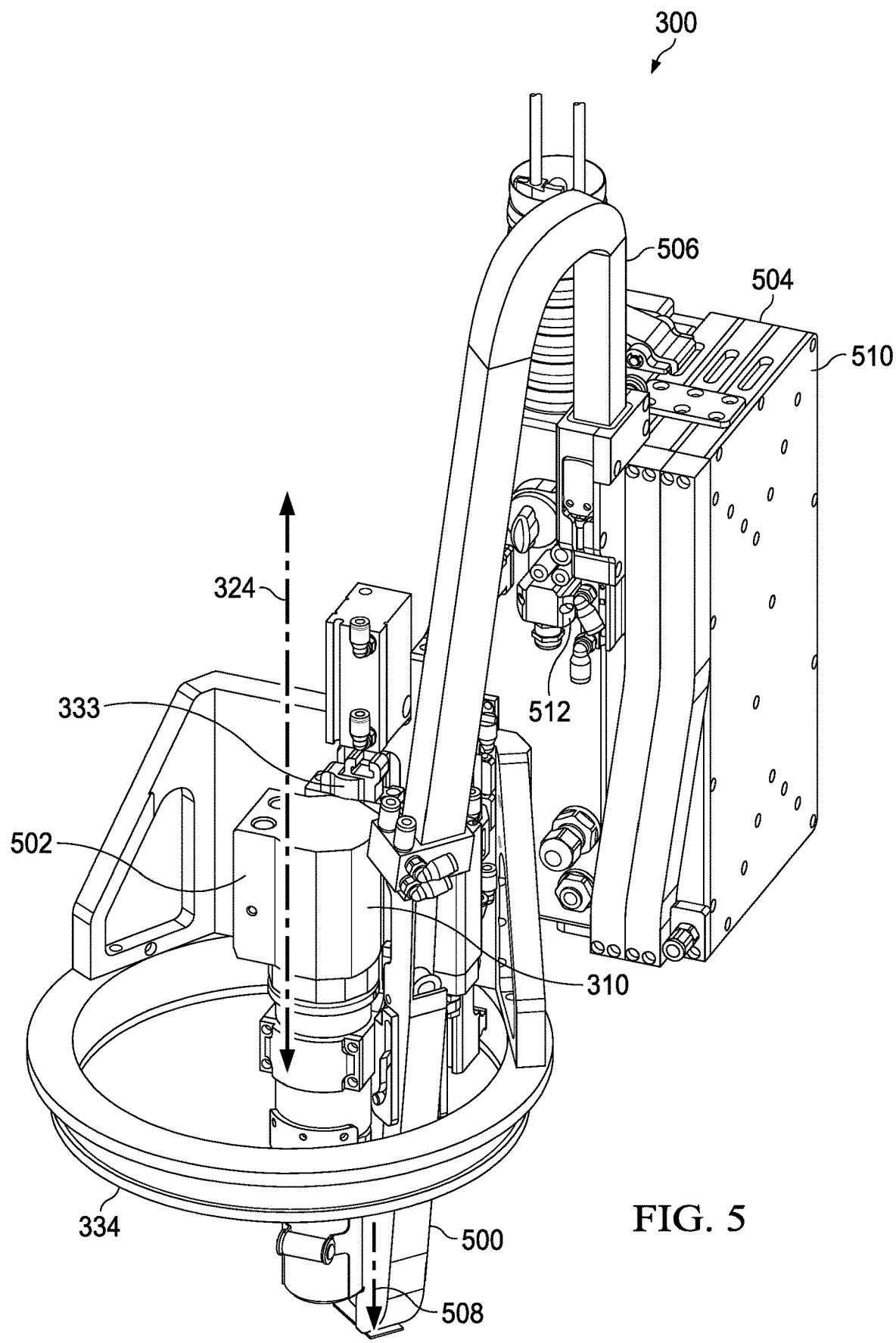
FIG. 5 is an illustration of a portion of an inner mold line machine in accordance with an illustrative embodiment.

With reference to FIG. 5, an illustration of a portion of inner mold line machine 300 is depicted in accordance with an illustrative embodiment. In this illustrative example, offset swage assembly 310 is within gear ring 334 while other components for inner mold line machine 300 are not shown. This partial illustration is employed to describe components in offset swage assembly 310 in a manner that avoids obscuring the illustration and description of these components.

In this illustrative example, offset swage assembly 310 comprises a number of different components. As depicted, offset swage assembly 310 includes collar holder 500, collar swage 502, and reservoir 504. Collar holder 500 is an example of one implementation for collar holder 134 shown in block form in FIG. 1. Collar swage 502 is an example of an implementation for engager 136 shown in block form in FIG. 1.

In this illustrative example, collar holder 500 is configured to receive a collar (not shown) from reservoir 504 and hold the collar for swaging by collar swage 502. As depicted, reservoir 504 is connected to collar holder 500 by tube 506. Reservoir 504 holds collars (not shown).

As depicted, collar holder 500 holds a collar (not shown) on axis 508 which is parallel to rotation axis 324. As shown in this illustrative example, offset swage assembly 310 is configured to rotate about rotation axis 324 when gear ring 334 is moved. As offset swage assembly 310 rotates, axis 508 rotates about rotation axis 324 and can move from side to side of rotation axis 324.

In the depicted example, reservoir 504 in FIG. 5 takes the form of cartridge 510. Collars (not shown) stored in cartridge 510 can be fed from cartridge 510 to collar holder 500 using collar injector 512. Collar injector 512 can be a cam or cam activated collar feed mechanism and may use compressed air to feed a collar (not shown) to collar holder 500 from reservoir 504 via tube 506. In this manner, cartridge 510 functions as an onboard supply of collars for offset swage assembly 310 in inner mold line machine 300.

The illustration of inner mold line machine 300 in FIGS. 3-5 is not meant to limit the manner in which an inner mold line machine or other machine employing an offset collar installer may be implemented. For example, other types of fastener systems may be used in place of offset swage assembly 310 in which pins and collars are inserted by swaging. For example, another type of offset collar installer may cause engagement by rotating at least one of a collar or a bolt such that threads or grooves in these components engage each other.

In another illustrative example, other types of rotational systems may be implemented in which other degrees of movement are present other than 360 degrees. In another illustrative example, offset swage assembly 310 moves 90 degrees, 180 degrees, 270 degrees, or some other amounts of movement about rotation axis 324. In yet another illustrative example, vacuum system 314 may be omitted from inner mold line machine 300. In still another illustrative example, these components may be implemented as part of an outer mold line machine.

In other illustrative examples, other types of reservoirs may be implemented. For example, a remote bowl feeder can be used in place of a cartridge for reservoir 504.

Turning to FIGS. 6-15, illustrations of an inner mold line machine operating to install a fastening system are depicted in accordance with an illustrative embodiment. These figures show operations performed to install fastener system using offset swage assembly 310.

Figure 6:
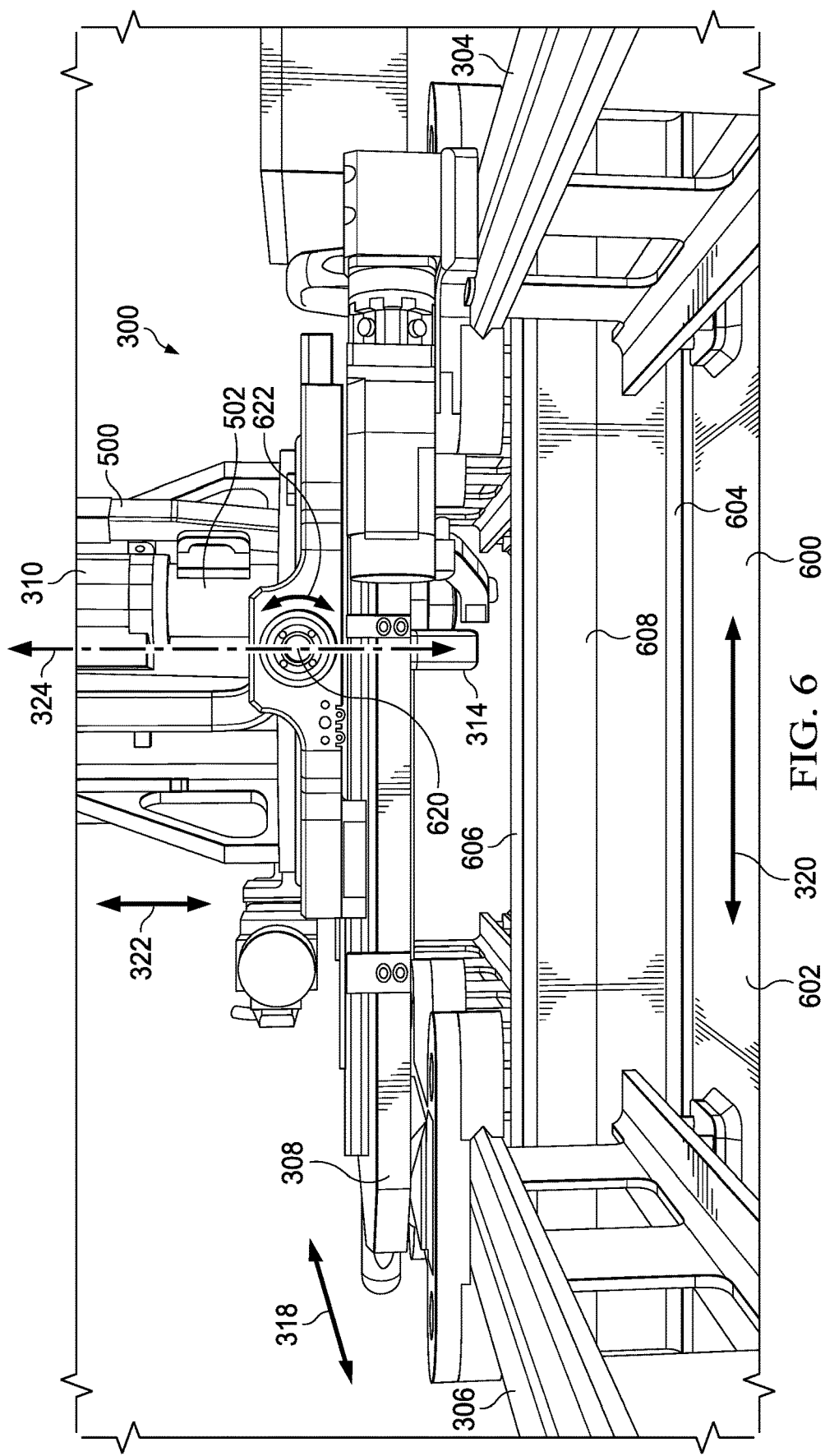
FIGS. 6-15 are illustrations of an inner mold line machine operating to install a fastener system in accordance with an illustrative embodiment.

With reference first to FIG. 6, an illustration of track system 302 attached to inner mold line side 600 of fuselage section 602 is depicted in accordance with an illustrative embodiment. As depicted, a fastener system (not shown) can be installed in frame 604 on fuselage section 602. For example, the fastener system can be installed under overhang 606 in frame 604 using offset swage assembly 310 for inner mold line machine 300. In this illustrative example, frame 604 has an I-cross section resulting in overhang 606.

As depicted, offset swage assembly 310 for inner mold line machine 300 is positioned at front side 608 of frame 604 to install a fastener system.

As depicted in this illustrative example, A-axis 620 is also present for inner mold line machine 300. A-axis 620 is center and perpendicular to rotation axis 324. Offset swage assembly 310 can be rotated in the direction of arrow 622 about A-axis 620. This type of rotation can be used when inner mold line side 600 is contoured. The rotation can be used to normalize offset swage assembly 310 to inner mold line side 600.

In this depicted example, vacuum system 314 and camera 316 are in line with rotation axis 324 during some operations of these components.

Figure 7:
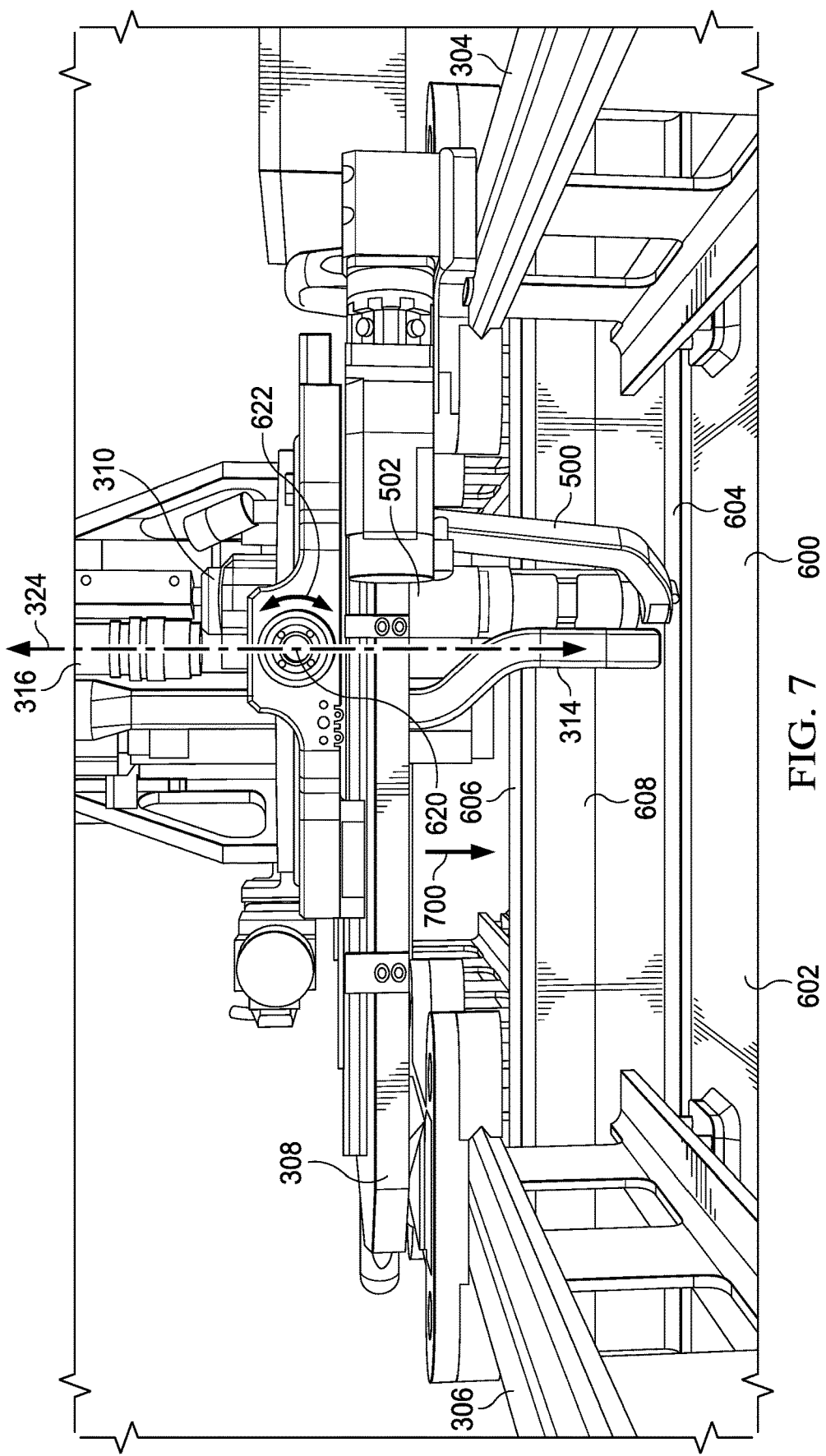

With reference to FIG. 7, an illustration of a movement of offset swage assembly 310 and vacuum system 314 in the direction of arrow 700 towards inner mold line side 600 is shown. This movement of offset swage assembly 310 and vacuum system 314 is performed in preparation to install a fastener system (now shown) to connect frame 604 to fuselage section 602.

Figure 8:
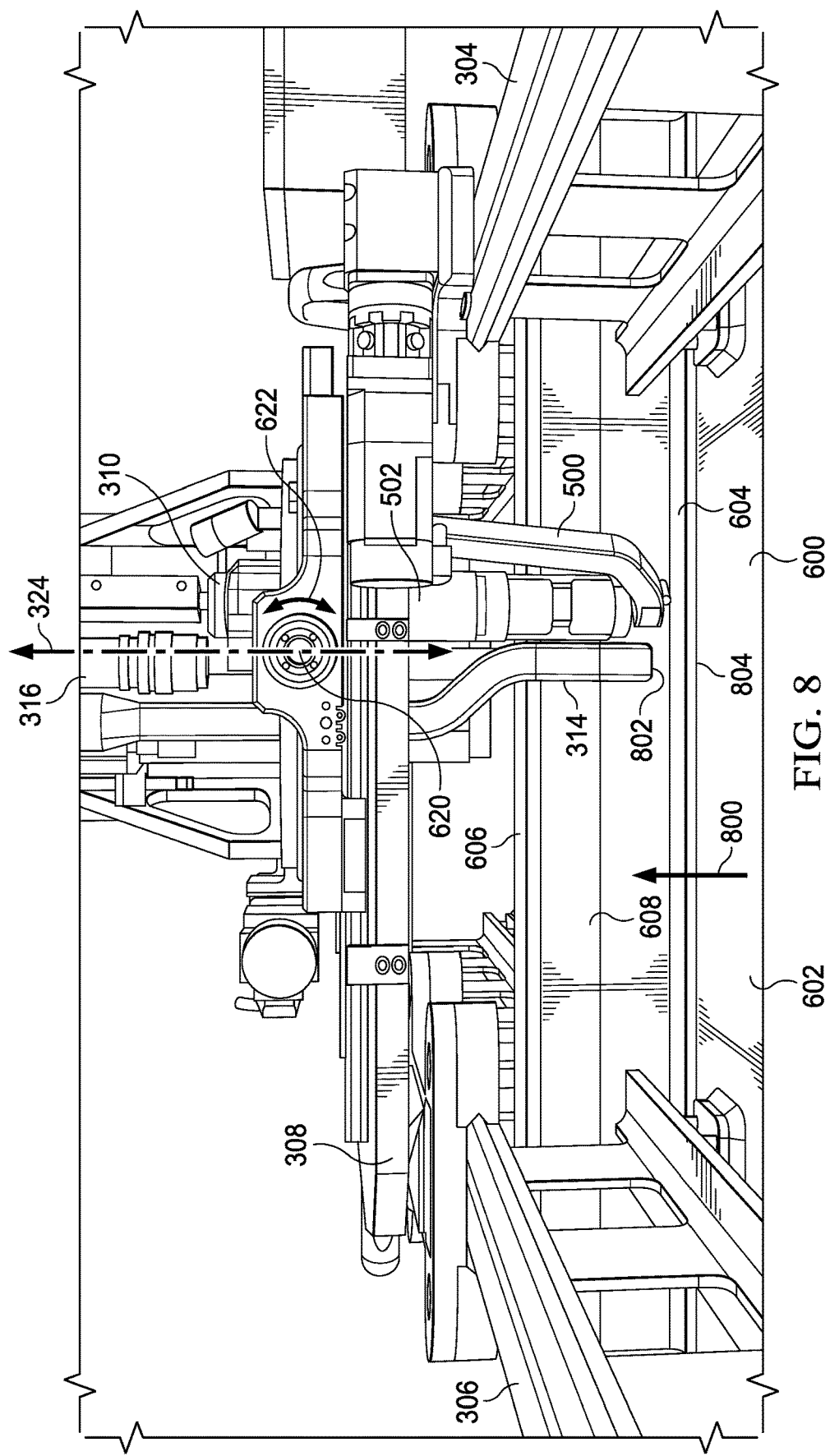

In FIG. 8, inner mold line machine 300 is moved in the direction of arrow 800. As depicted, end 802 of vacuum system 314 is located over position 804. Position 804 is where the fastener system (not shown) will be installed in frame 604 to connect frame 604 to fuselage section 602.

Figure 9:
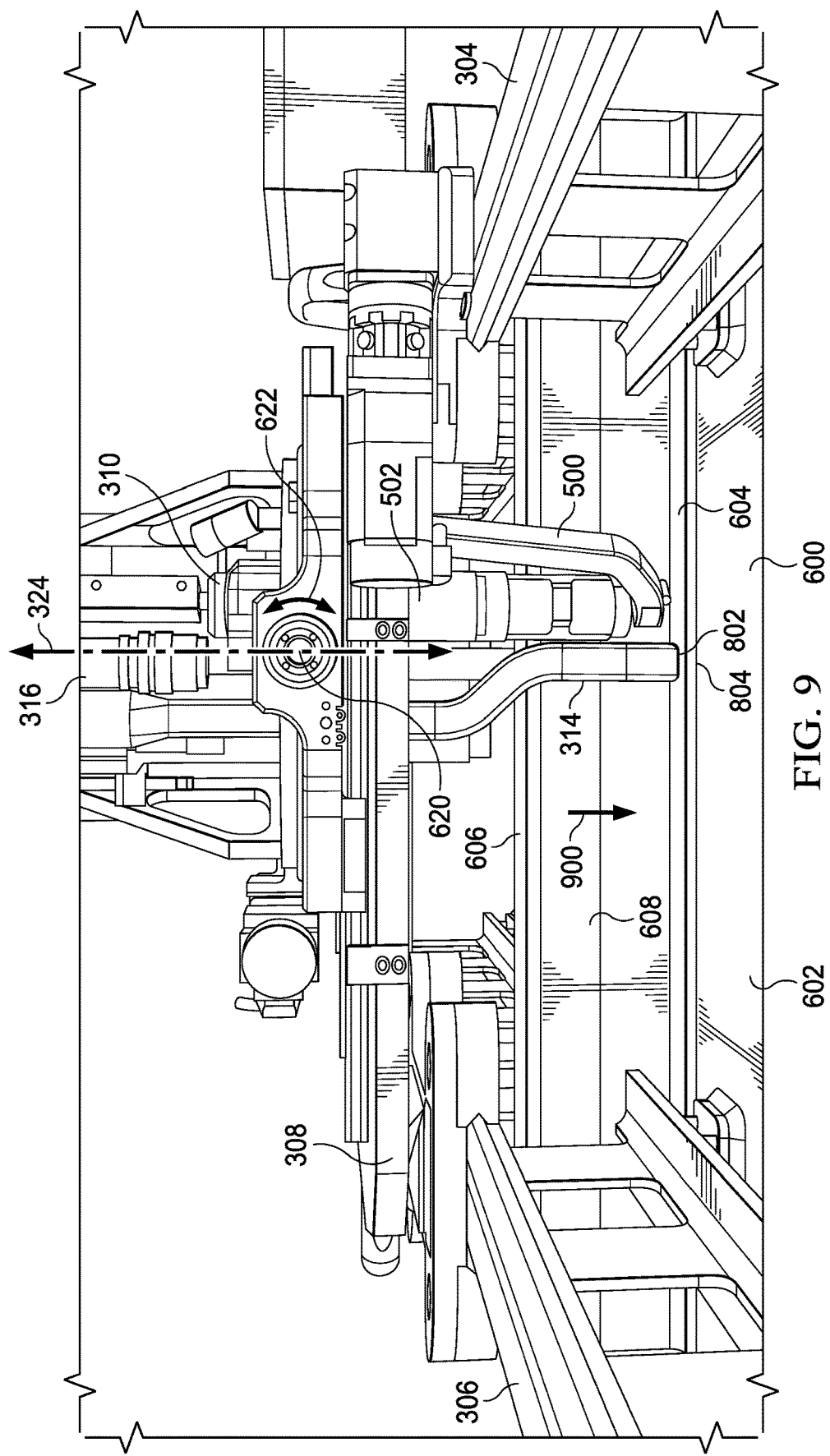

With reference next to FIG. 9, an illustration of extending vacuum system 314 is depicted in accordance with an illustrative embodiment. As depicted, vacuum system 314 is moved in the direction of arrow 900. With this movement, vacuum system 314 extends such that end 802 of vacuum system 314 touches frame 604 at position 804. In this position, camera 316 and laser sensor 402 are protected by vacuum system 314 from debris (not shown) that may be generated while drilling a hole (not shown) in position 804. In this position, vacuum system 314 can clamp to frame 604. This clamp up of vacuum system 314 enables removing debris generated while forming a hole (not shown) at position 804. In this illustrative example, the clamp up allows the holes to be drilled through without the need to separate, deburr, and clean up filings. In this example, the fay surface sealant is already present prior to drilling and subsequent fastener installation.

Figure 10:
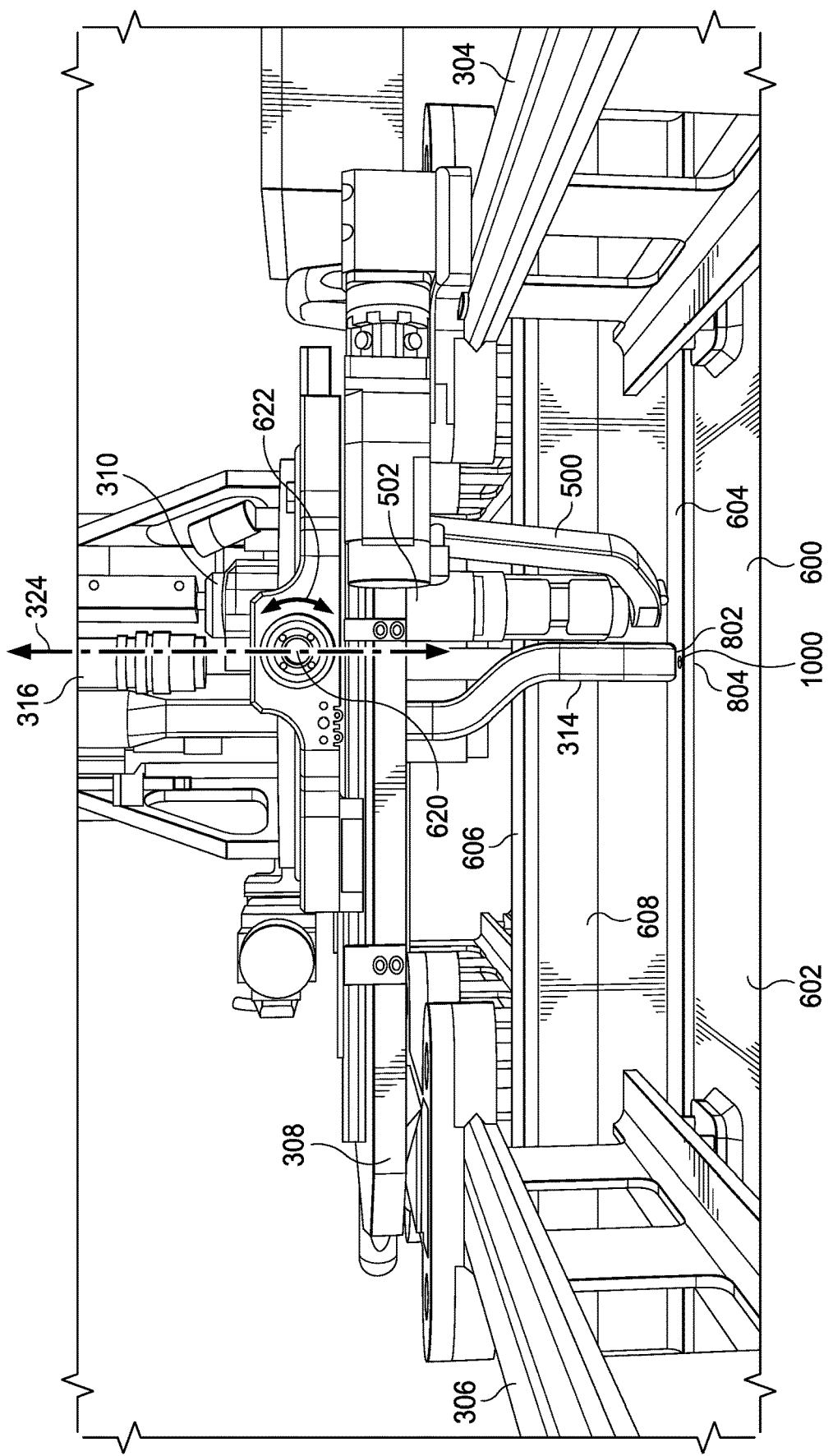

With reference now to FIG. 10, an illustration of hole 1000 is depicted in accordance with an illustrative embodiment. In this illustrative example, hole 1000 has been formed through frame 604 and fuselage section 602 at position 804. In this view, hole 1000 is shown on inner mold line side 600 of fuselage section 602. The positioning of end 802 of vacuum system 314 is performed to enable removal of debris (not shown) formed from drilling hole 1000. In this illustrative example, hole 1000 is formed by an outer mold line machine (not shown).

Figure 11:
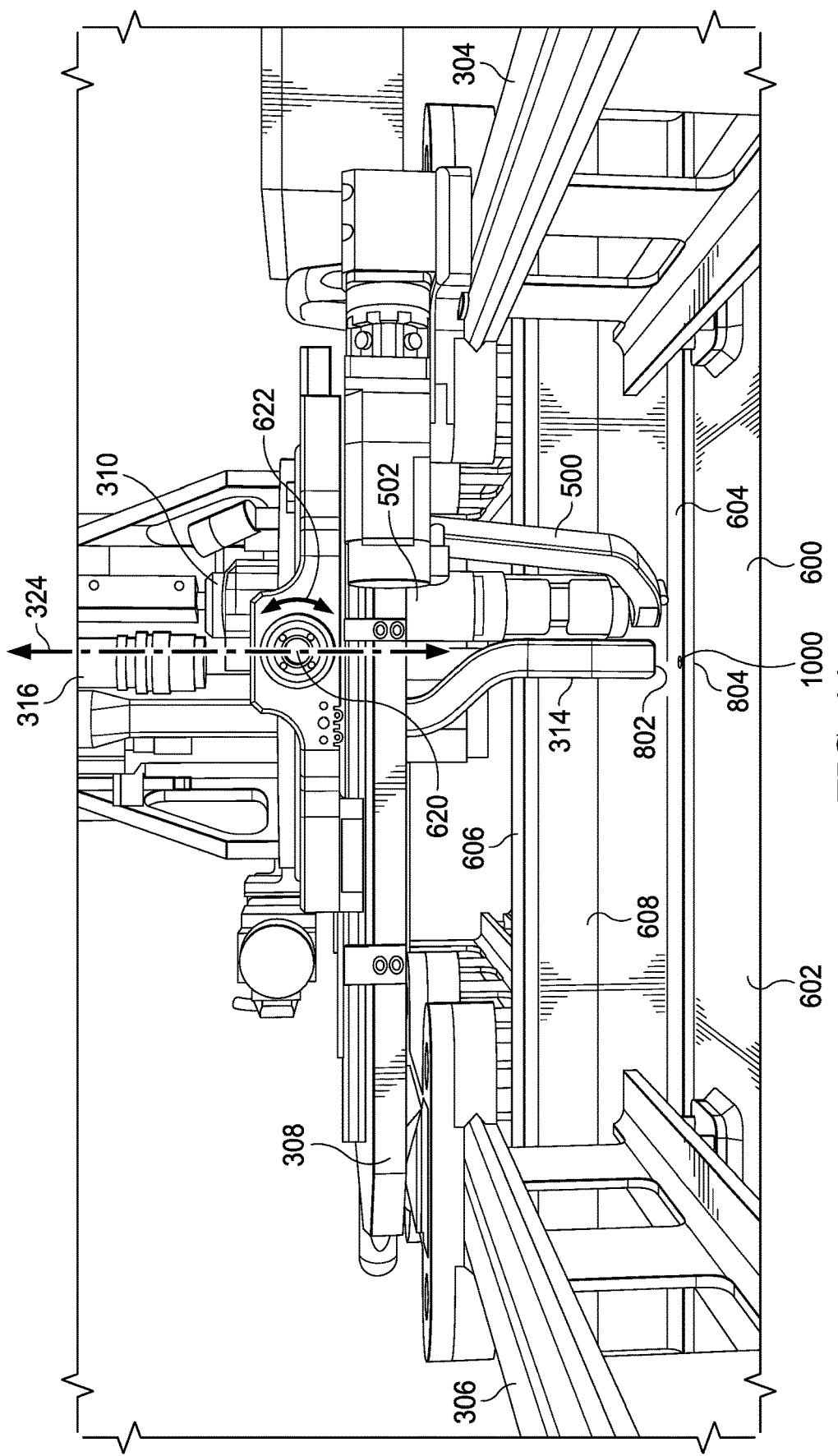

In FIG. 11, an illustration of inspecting hole 1000 is depicted in accordance with an illustrative embodiment. In this illustrative example, vacuum system 314 is moved away from position 804 in a manner that camera 316 is able to generate images of position 804 including hole 1000. In this manner, camera 316 generates data utilized to reposition offset swage assembly 310 to install a fastener system (not shown).

Figure 12:
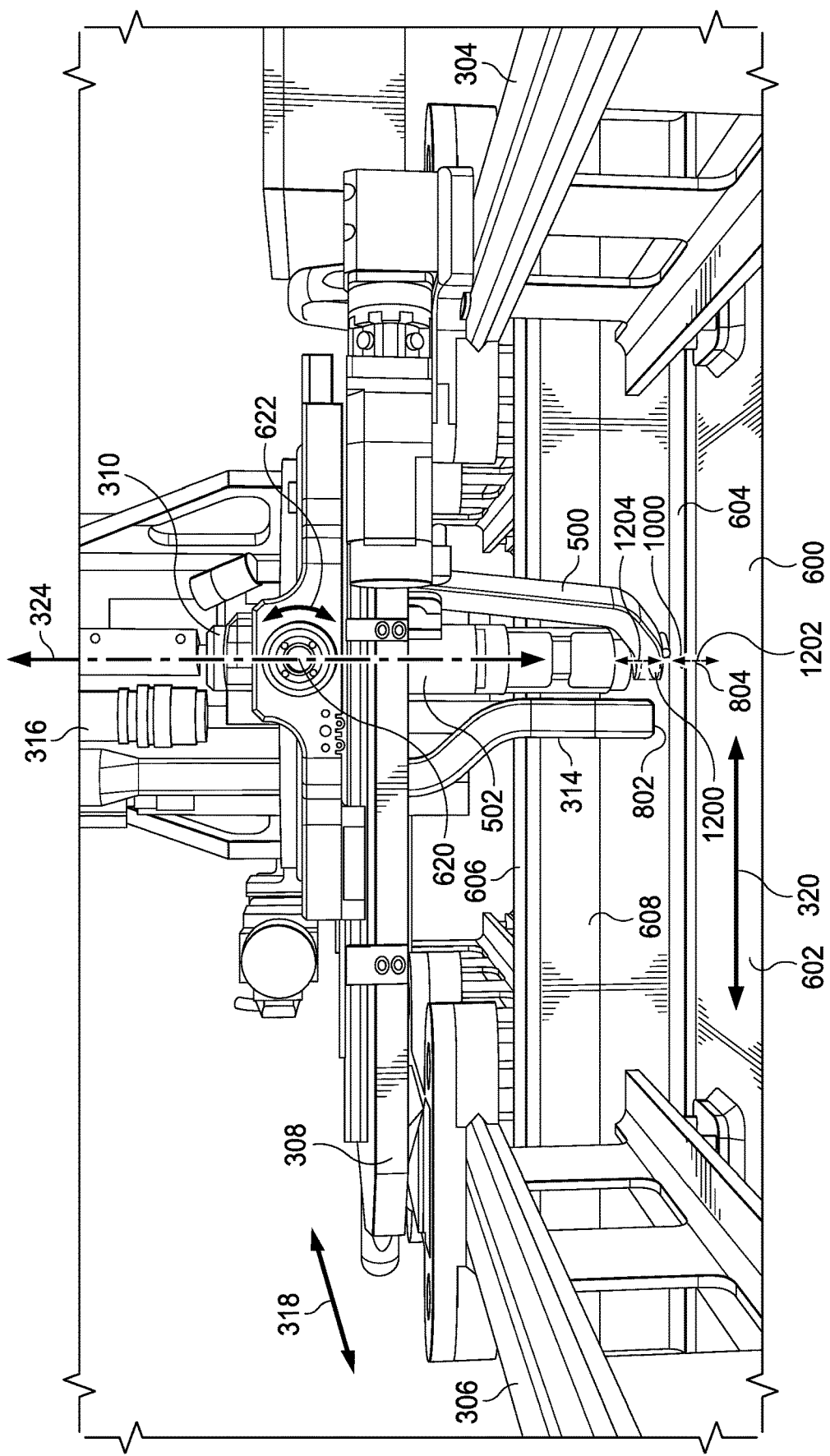

Turning to FIG. 12, an illustration of repositioning offset swage assembly 310 is depicted in accordance with an illustrative embodiment. As depicted, platform 308 is moved about at least one of y-axis 320 or x-axis 318. This movement of platform 308 is performed to move offset swage assembly 310 over position 804 of hole 1000. Additionally, collar 1200, shown in phantom, is fed into collar holder 500 in offset swage assembly 310 at position 804 over hole 1000.

As depicted, offset swage assembly 310 can be moved to position offset swage assembly 310 with a desired orientation relative to hole 1000. The alignment may be performed in a number of different ways. For example, offset swage assembly 310 can be moved along at least one of x-axis 318, y-axis 320, or z-axis 322. Further, offset swage assembly 310 can be rotated about rotational axis 324 to position offset swage assembly 310 relative to hole 1000. Further, offset swage assembly 310 can be rotated about A-axis 620. The rotation of offset swage assembly 310 about A-axis 620 can be performed to align collar 1200 in collar holder 500 relative to at least one of inner mold line side 600 or centerline 1202 for hole 1000 with centerline 1204 for collar 1200.

In some illustrative examples, this alignment can be performed with respect to a pin tail for a pin inserted through hole 1000. This type of alignment can be performed if the pin is inserted into hole 1000 prior to positioning collar 1200.

Figure 13:
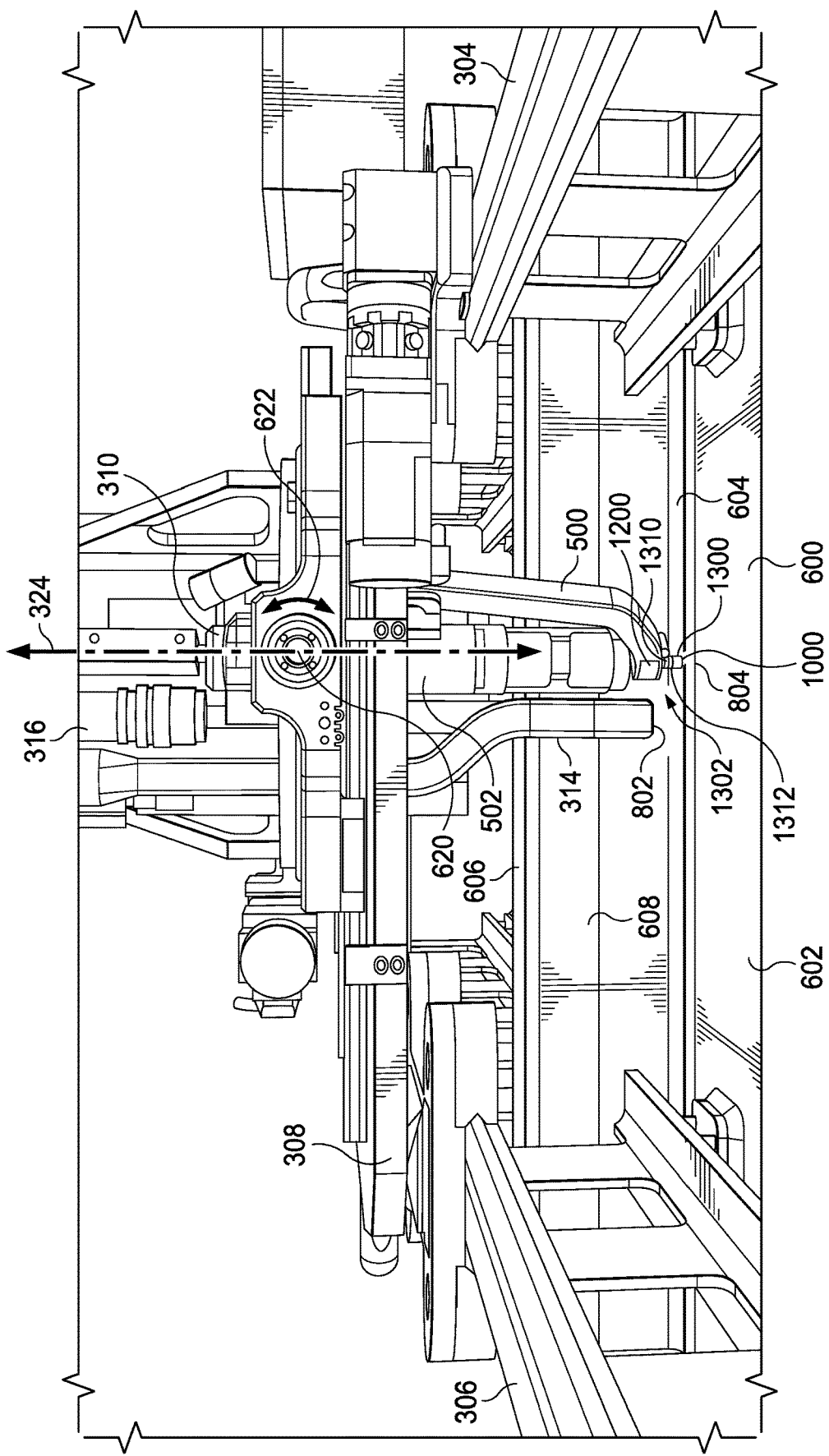

With reference to FIG. 13, an illustration of pin 1300 inserted through hole 1000 is depicted in accordance with an illustrative embodiment. In this illustrative example, pin 1300 is inserted through hole 1000 such that pin 1300 is fully seated within hole 1000. In this example, pin 1300 extends through collar 1200 shown in phantom. Pin 1300 and collar 1200 form fastener system 1302. Pin tail 1310 connected to pin 1300 at end 1312 of pin 1300 in this example.

Figure 14:
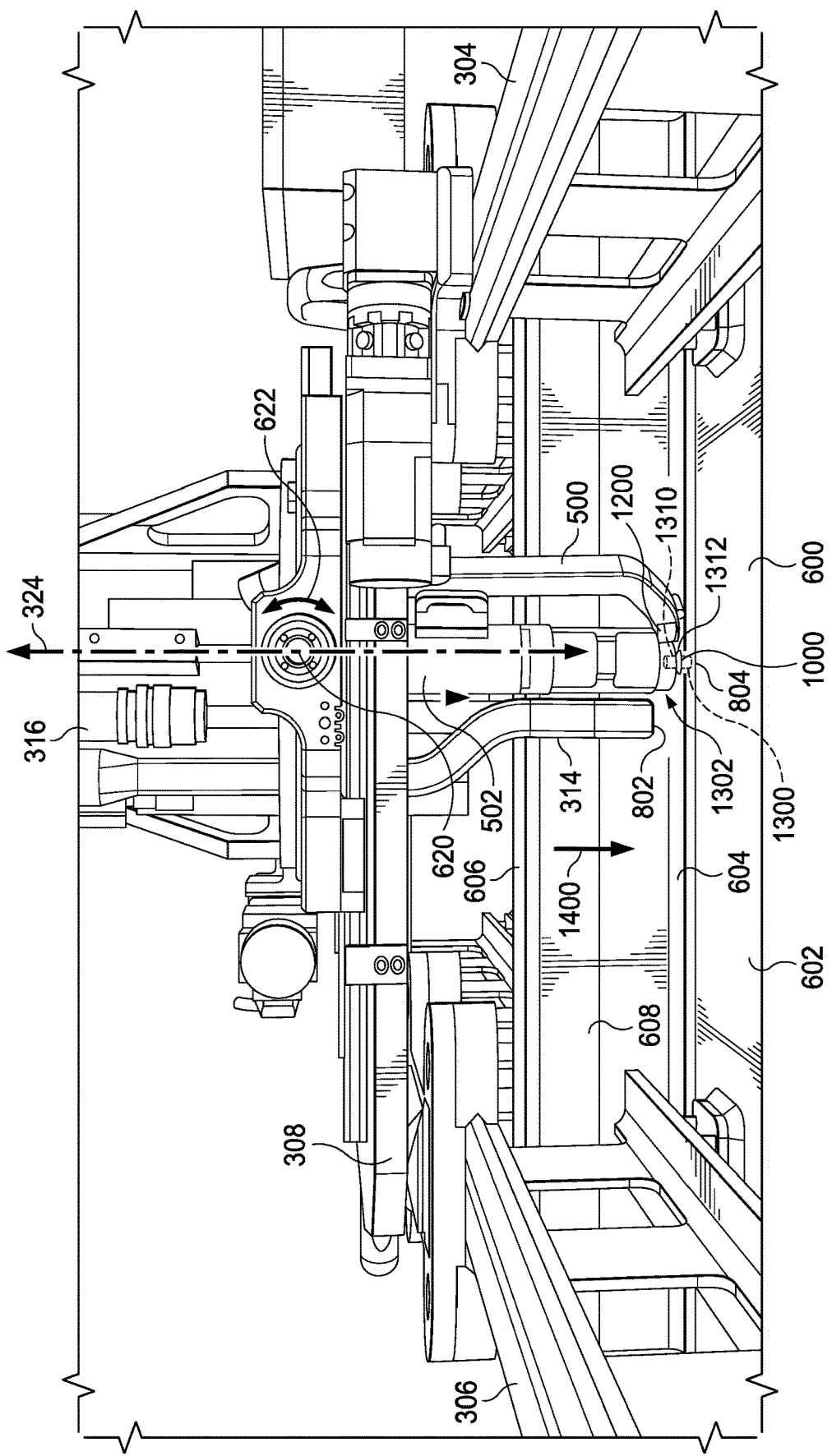

Turning to FIG. 14, an illustration of swaging fastener system 1302 is depicted in accordance with an illustrative embodiment. In this figure, with pin 1300 extending through collar 1200, collar holder 500 has moved away from hole 1000 at position 804. Collar swage 502 in offset swage assembly 310 has been moved in the direction of arrow 1400 to insert collar 1200 onto a pin tail 1310 at end 1312 of pin 1300 for swaging to fasten collar 1200 and pin 1300 in fastener system 1302 to each other.

Figure 15:
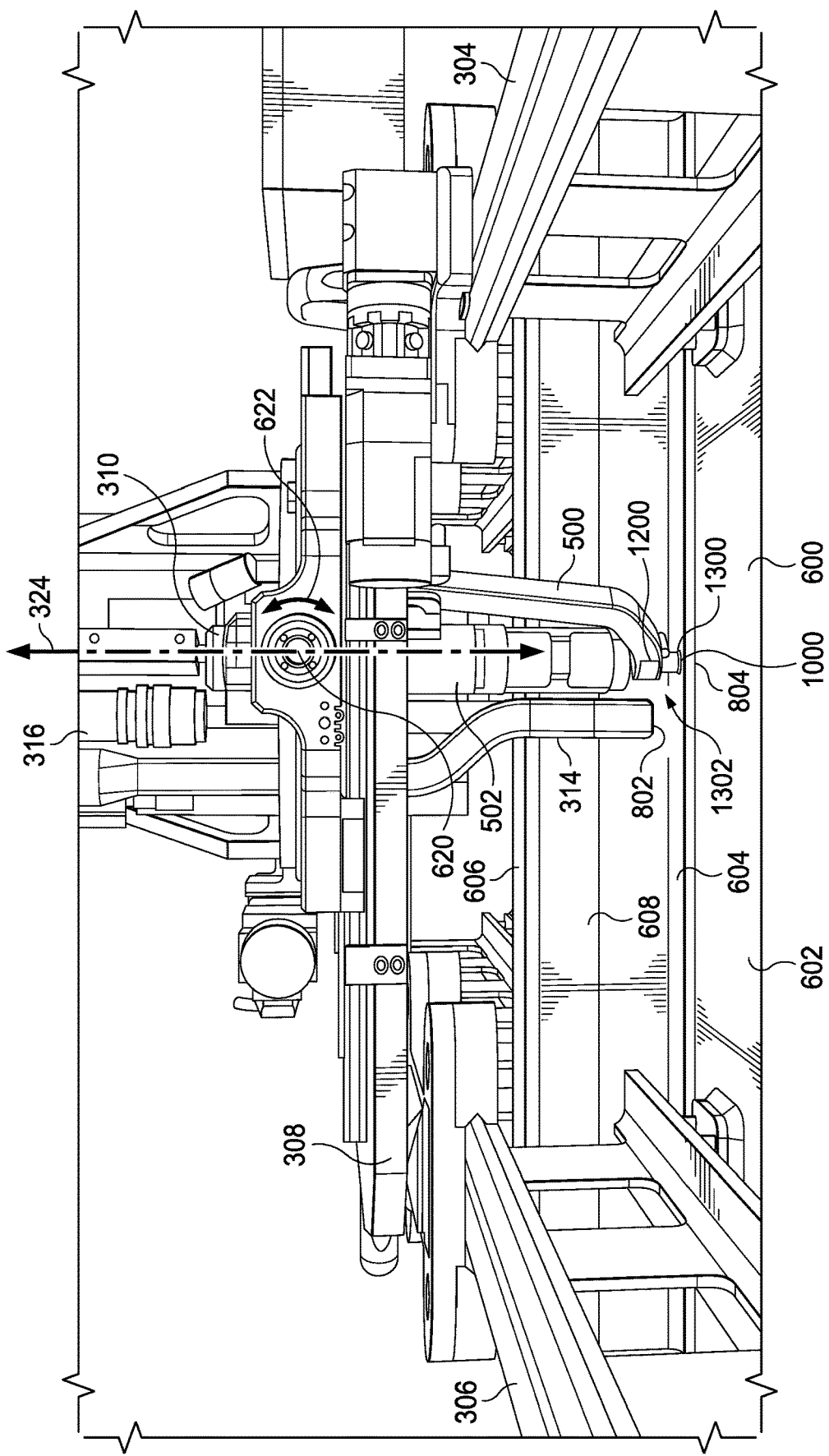

In FIG. 15, an illustration of installed fastener system 1302 is depicted in accordance with an illustrative embodiment. As depicted, offset swage assembly 310 is moved away from fastener system 1302, which has now been installed to connect frame 604 and fuselage section 602 to each other. As depicted in these examples, installation of fastener system 1302 has performed with offset swage assembly 310 for inner mold line machine 300 located under overhang 606 for frame 604.

The illustration of installing fastener system 1302 utilizing inner mold line machine 300 with offset swage assembly 310 in FIGS. 6-15 is provided for illustrating one manner in which fastener system 1302 may be installed. The operations and components illustrated are not meant to limit the manner in which fasteners may be installed utilizing inner mold line machine 300. For example, vacuum system 314 may be omitted in some examples. For example, hole 1000 may have been previously drilled. In the illustrative examples, camera 316 may be located remotely from platform 308.

Figure 16:
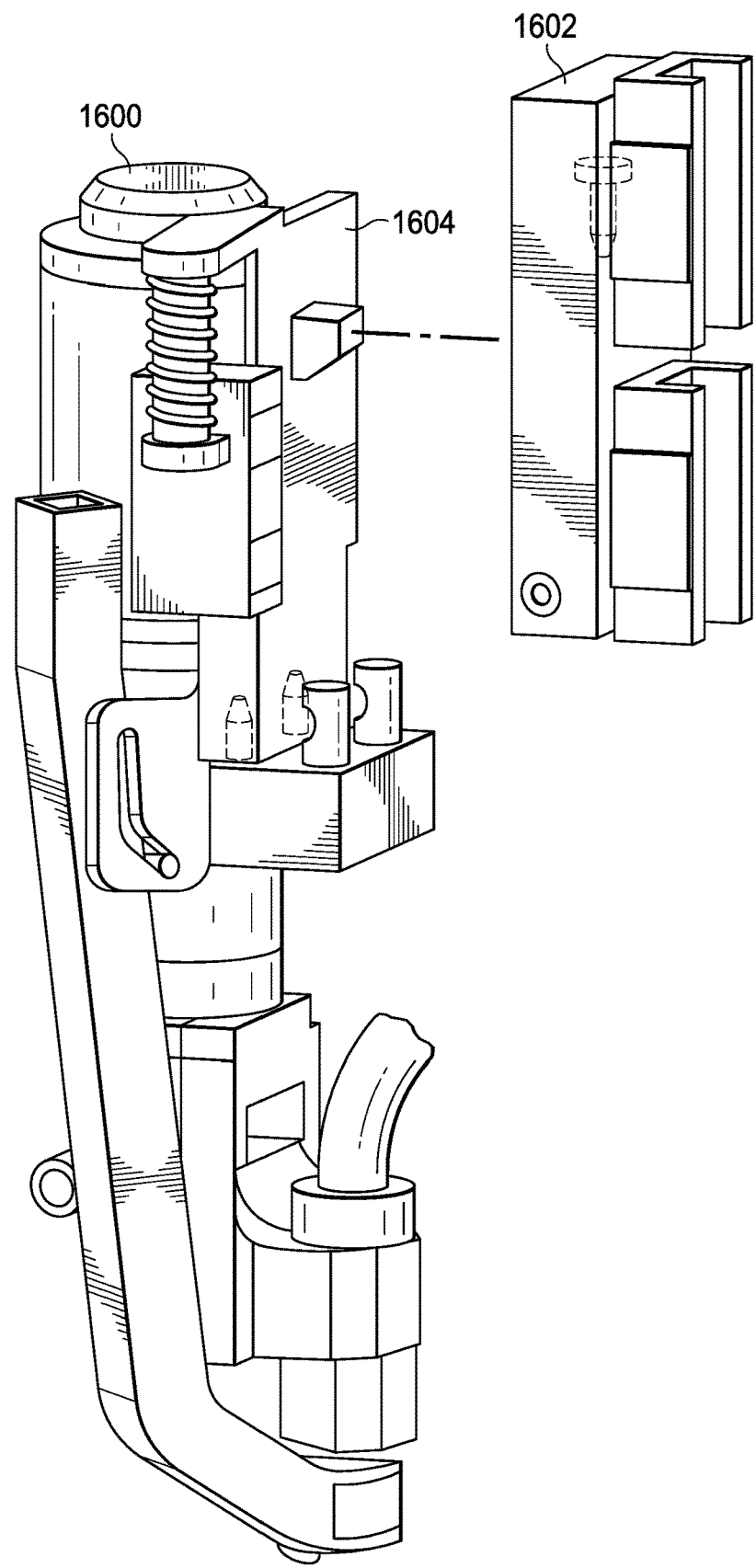
FIGS. 16-18 are illustrations of a process for connecting an offset collar installer in accordance with an illustrative embodiment.
Figure 17:
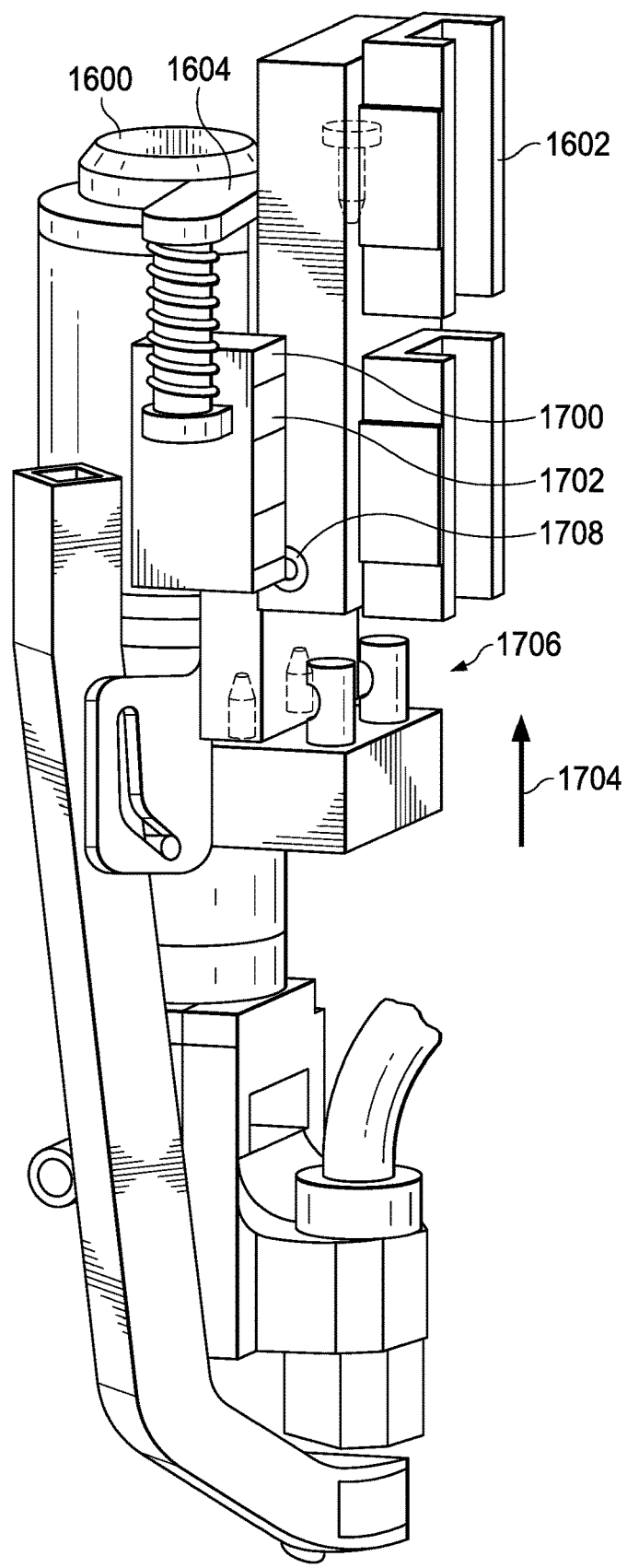
Figure 18:
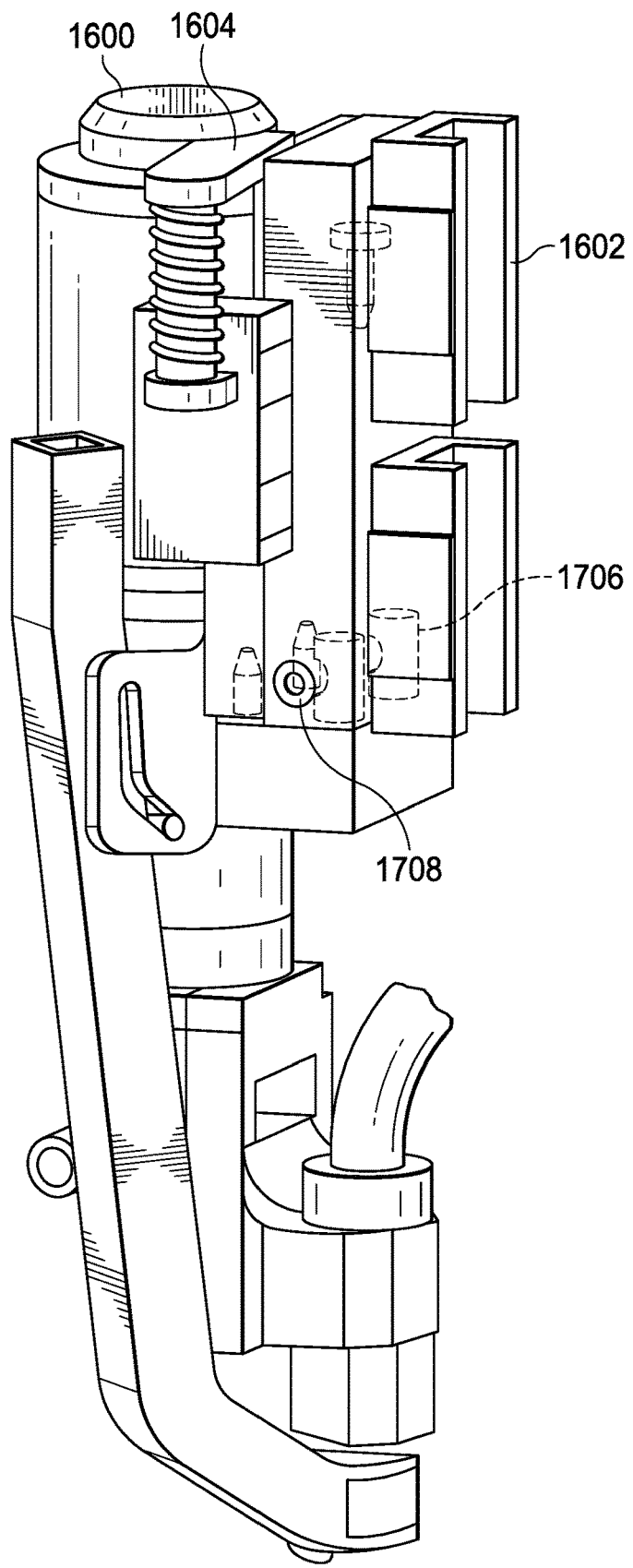

FIGS. 16-18 illustrate a process for connecting an offset collar installer depicted in accordance with an illustrative embodiment. With reference first to FIG. 16, an illustration of offset collar installer 1600 and mount 1602 is depicted in accordance with an illustrative embodiment. As depicted, offset collar installer 1600 includes adapter 1604, which can be quickly connected and disconnected from mount 1602. Adapter 1604 and mount 1602 are examples of components that can be used to implement change assembly 162 shown in block form in FIG. 1.

Turning next to FIG. 17, an illustration of adapter 1604 engaging mount 1602 is depicted in accordance with an illustrative embodiment. As depicted in this figure, top 1700 of adapter 1604 has engaged alignment pin 1702 when moving offset collar installer 1600 with adapter 1604 in the direction of arrow 1704. Moving offset collar installer 1600 further in the direction of arrow 1704 will cause cam pins 1706 to engage cam lock 1708.

Next, in FIG. 18, offset collar installer 1600 connected to mount 1602 is depicted in accordance with an illustrative embodiment. In this figure, cam lock 1708 is manipulated to engage cam pins 1706 (not shown) on adapter 1604.

Figure 19:
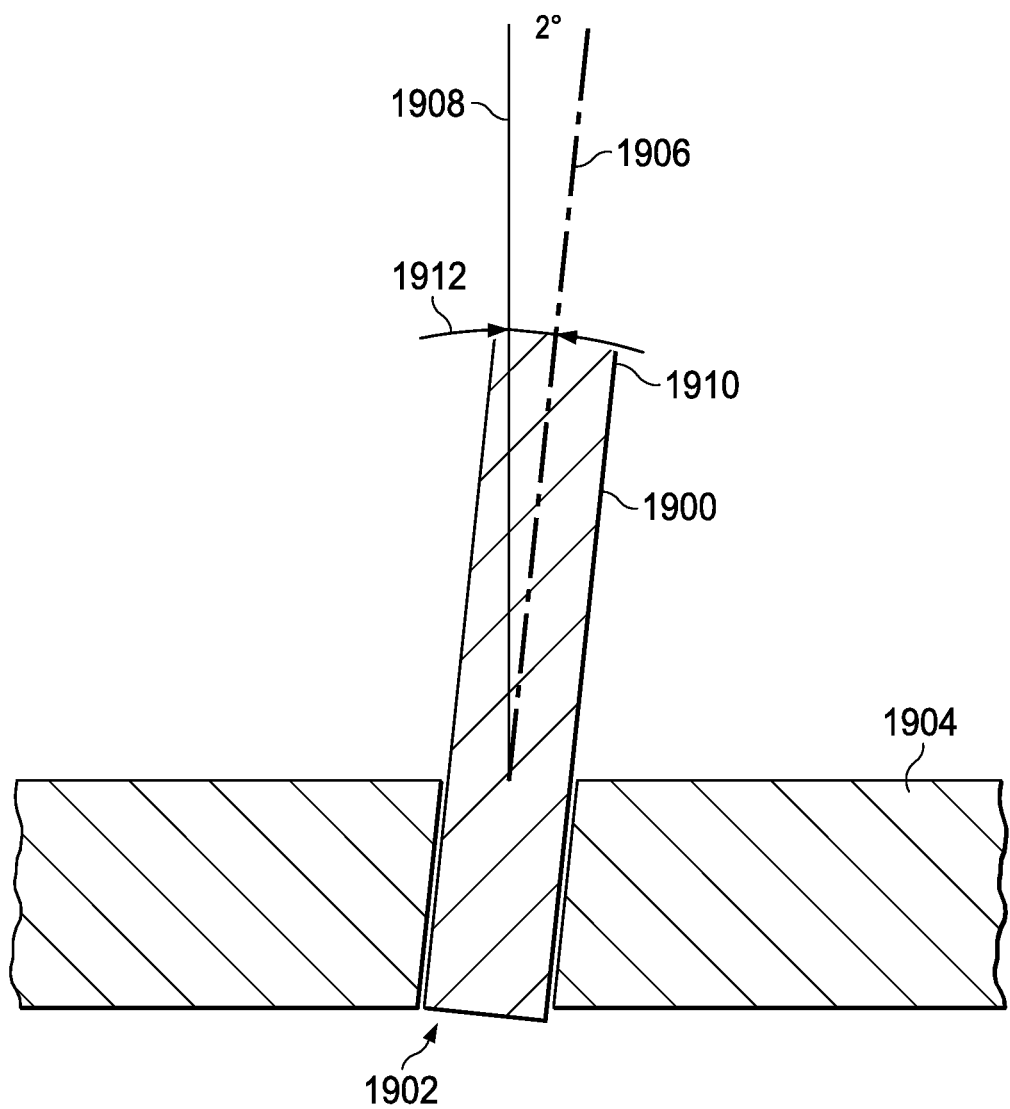
FIG. 19 is an illustration of a pin in a hole in a structure in accordance with an illustrative embodiment.

With reference next to FIG. 19, an illustration of pin 1900 in hole 1902 in structure 1904 is depicted in accordance with an illustrative embodiment. In this illustrative example, pin 1900 is on axis 1906. As depicted, pin 1900 on axis 1906 deviates from normal 1908 by two degrees. This deviation of axis 1906 from normal 1908 is within tolerance when a collar (not shown) is engaged with pin 1900. As axis 1906 increases in deviation from normal 1908, lateral distance 1912 of insertion end 1910 increases.

Although within tolerance, this deviation and other deviations make it difficult or impossible for currently available fastener installation systems to install fastener systems. The collar can be installed on pin 1900 using fastener installation system 208 shown in block form in FIG. 2 even with the depicted deviation from normal 1908.

With reference now to FIGS. 20-26, illustrations of an improved process for installing a fastener system are depicted in accordance with an illustrative embodiment. In this example, the different operations can be performed to install a fastener with an offset from perpendicular.

Figure 20:
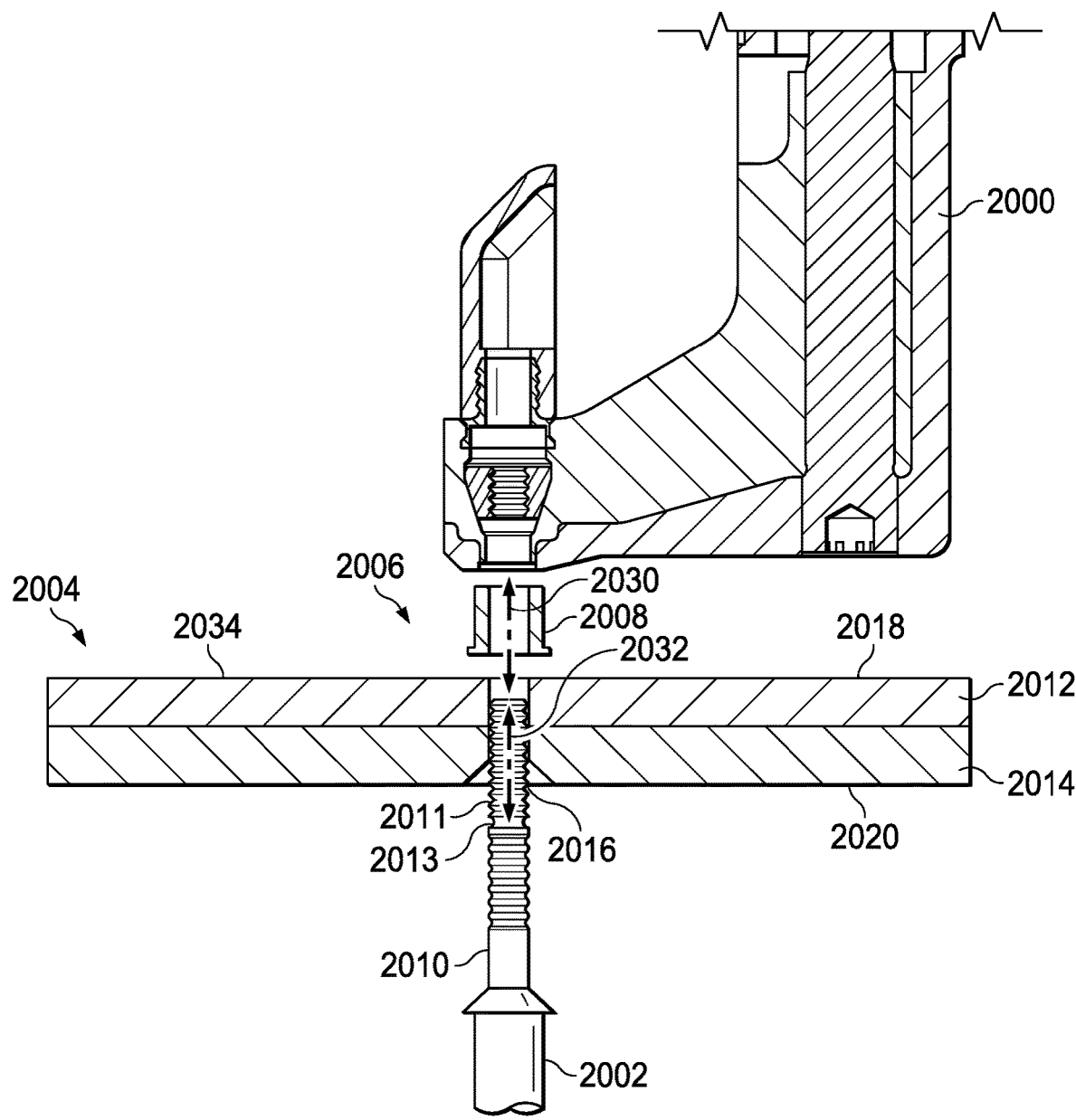
FIGS. 20-26 are illustrations of an improved process for installing a fastener system in accordance with an illustrative embodiment.

With reference first to FIG. 20, an illustration of swage tool 2000 positioned relative to structure 2004 is depicted in accordance with an illustrative embodiment. In FIG. 20, a cross-sectional view of a portion of swage tool 2000, outer mold line tool 2002, and structure 2004 are shown. In this illustrative example, swage tool 2000 may be part of fastener installation system 208 in FIG. 2 or an implementation for offset swage assembly 310 in FIG. 3. In another illustrative example, swage tool 2000 may be implemented using a currently available swage tool.

Only portions of these tools are shown to focus on illustrating operations performed to install fastener system 2006 comprising collar 2008 and pin 2010. As depicted, pin tail 2011 is located at end 2013 of pin 2010. Other portions of these tools are not shown to avoid obscuring the illustration and description of the process.

As depicted, structure 2004 is an example of an implementation of structure 204 shown in block form in FIG. 2. Structure 2004 comprises component 2012 and component 2014. Hole 2016 has been drilled through structure 2004.

As depicted in this example, collar 2008 has been aligned with hole 2016 to obtain alignment concentricity between these two components. In other words, centerline 2030 for collar 2008 can be aligned with centerline 2032 for hole 2016 to obtain alignment concentricity between these two components. As depicted in this example, centerline 2032 is substantially normal or perpendicular to surface 2034 of inner mold line side 2018. As a result, collar 2008 is positioned such that centerline 2030 is aligned or matches centerline 2032.

As depicted, swage tool 2000 is an example of one implementation of swage tool 224 shown in block form in FIG. 2. Outer mold line tool 2002 is an example of an implementation of outer mold line machine 246 shown in block form in FIG. 2. In this illustrative example, swage tool 2000 is located on inner mold line side 2018 of structure 2004, while outer mold line tool 2002 is located on outer mold line side 2020 of structure 2004.

As depicted, pin 2010 has been inserted into hole 2016 from outer mold line side 2020 of structure 2004 utilizing outer mold line tool 2002. In this example, only a portion of outer mold line tool 2002 is utilized to insert pin 2010 as depicted.

Figure 21:
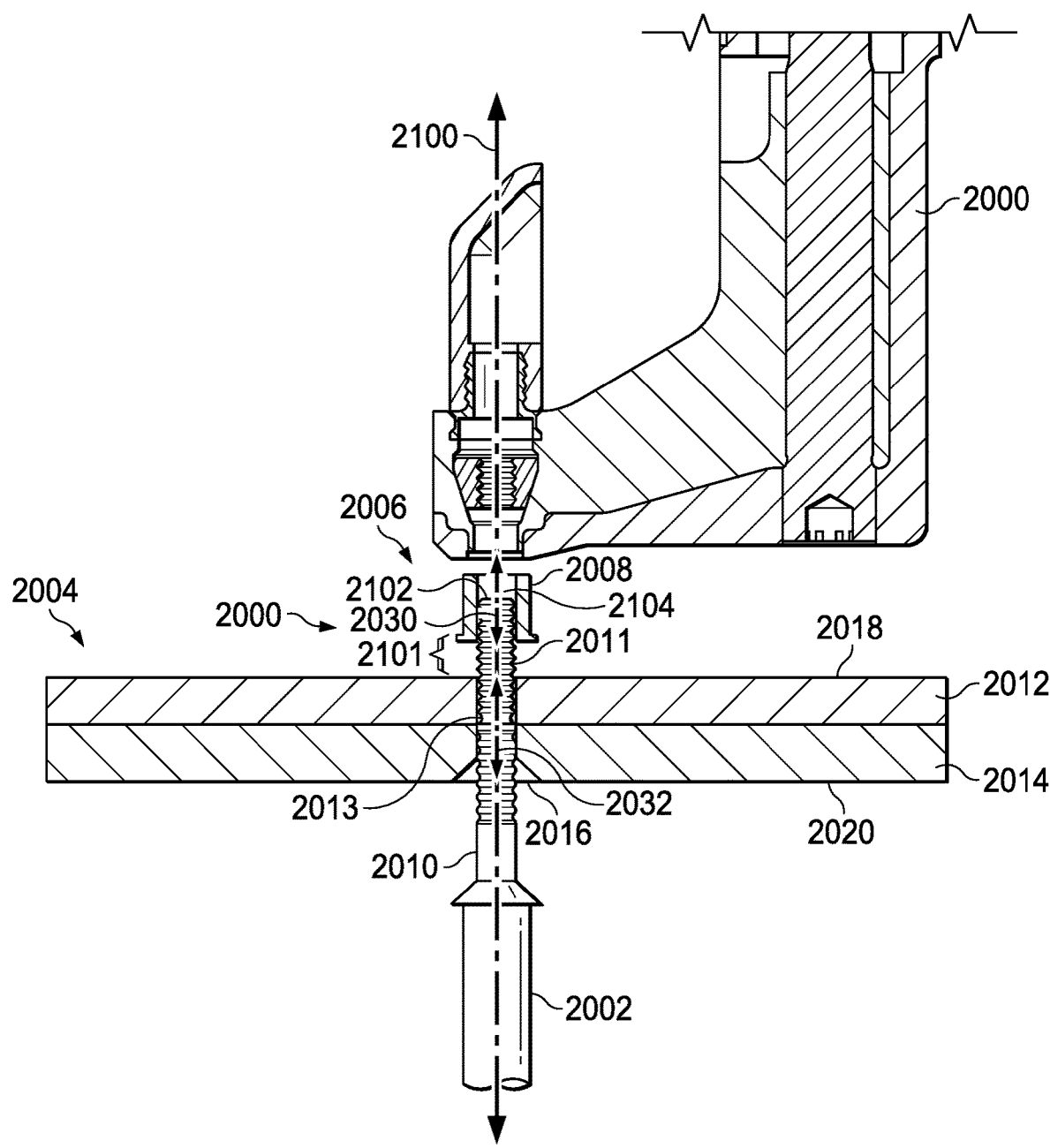

With reference to FIG. 21, an illustration of pin 2010 extending into collar 2008 is depicted in accordance with an illustrative embodiment. In this illustrative example, pin 2010 extends through hole 2016 and into collar 2008.

In this example, collar 2008 is positioned over hole 2016 at distance 2101 above hole 2016. Distance 2101 can be selected to allow deviation of line 2100 from normal with respect to inner mold line side 2018 at hole 2016. In other words, distance 2101 can be selected such that end 2102 can extend through channel 2104 in collar 2008. As distance 2101 decreases, the amount of deviation in line 2100 from normal that can occur and allow for insertion of pin 2010 though channel 2104 of collar 2008 reduces.

Figure 22:
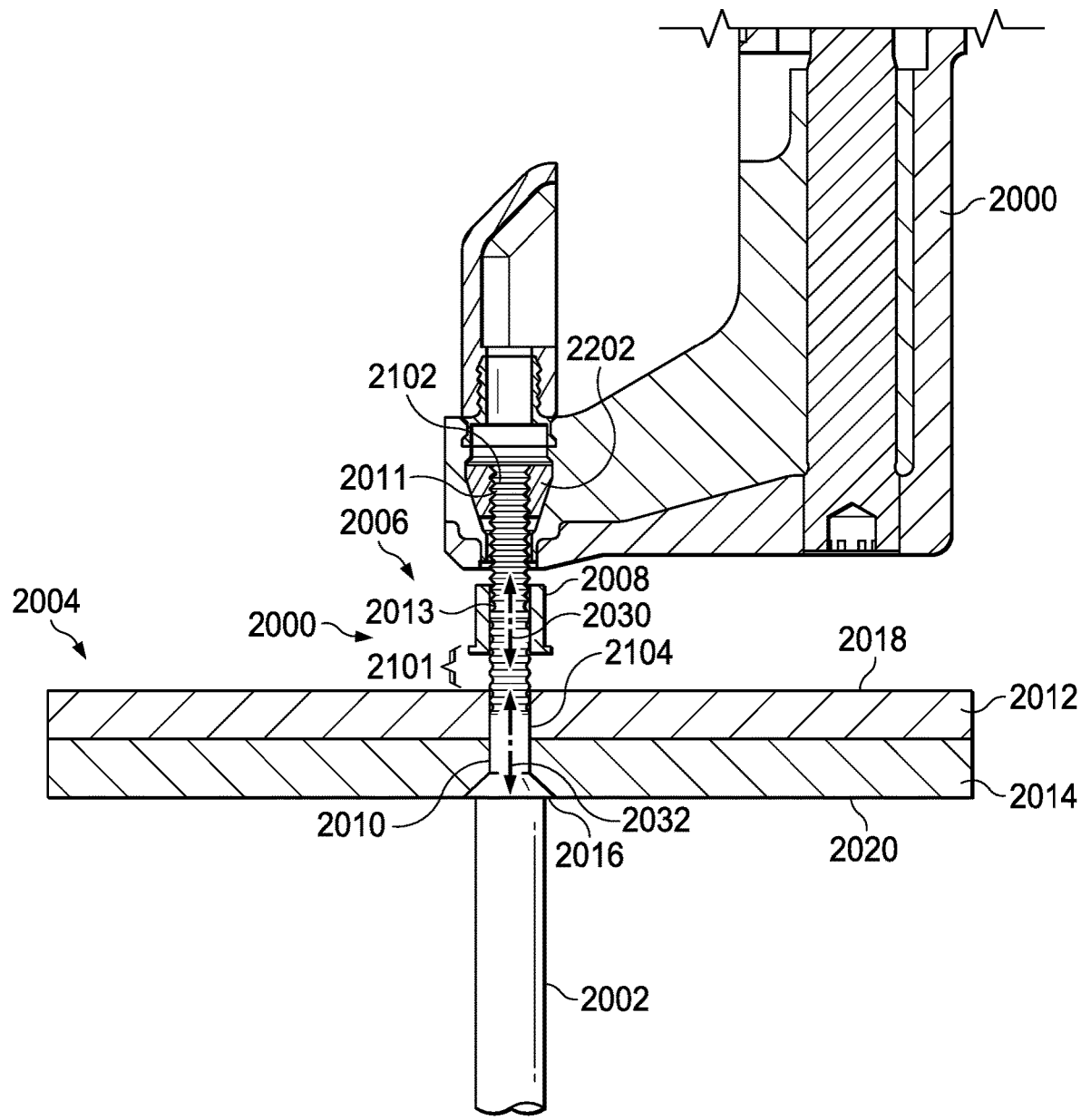

Turning now to FIG. 22, an illustration of pin 2010 in a fully seated position in hole 2016 is depicted in accordance with an illustrative embodiment. As depicted, pin 2010 is fully seated in hole 2016. Further, pin tail 2011 connected to pin 2010 at end 2013 of pin 2010 is engaged within jaws 2202 of swage tool 2000.

Figure 23:
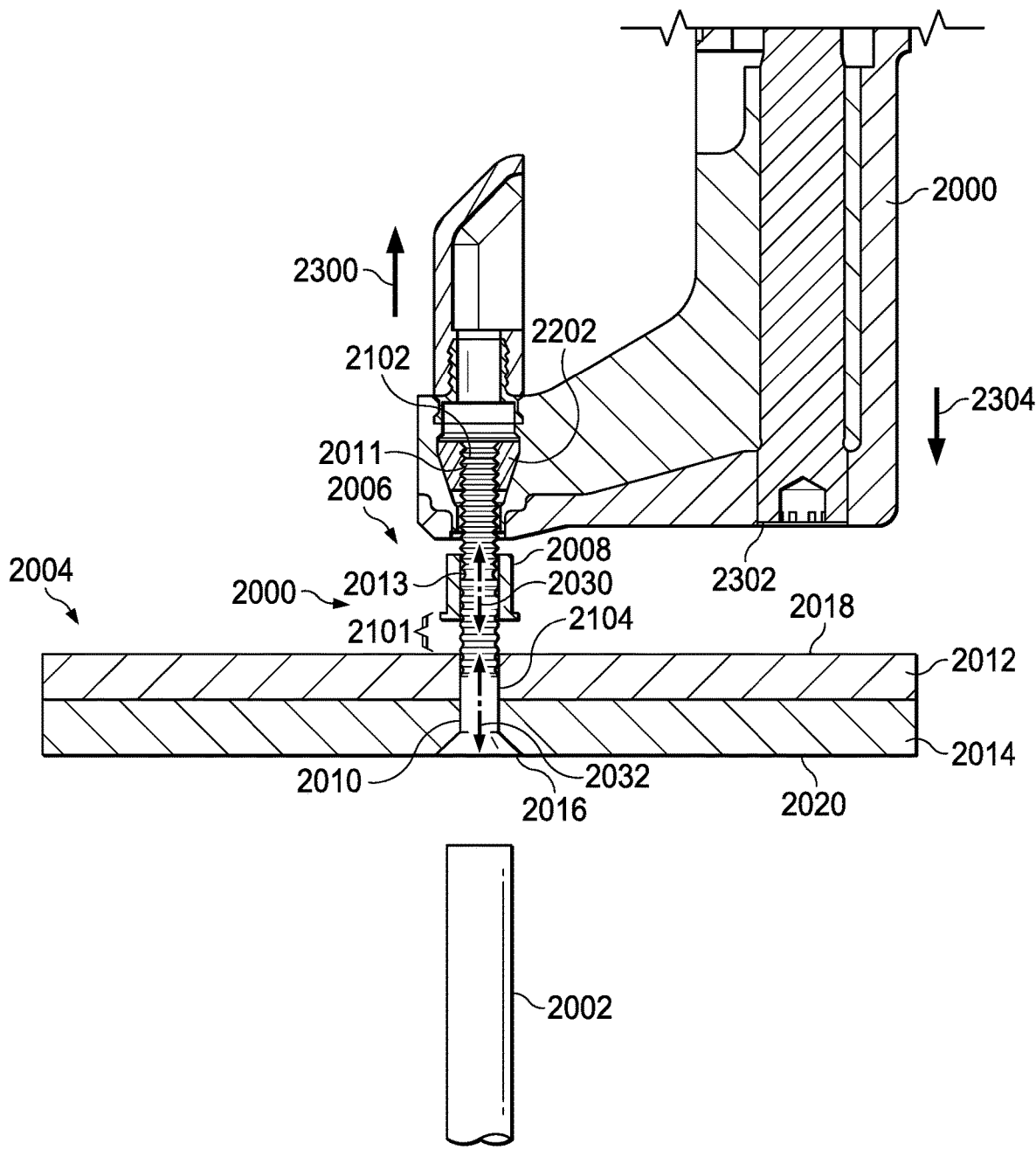

With reference to FIG. 23, an illustration of pulling pin tail 2011 is depicted in accordance with an illustrative embodiment. In this illustrative example, swage tool 2000 is a hydraulic swage tool. Swage tool 2000 is activated and pulls pin tail 2011 in the direction of arrow 2300. This operation causes anvil 2302 in swage tool 2000 to move in the direction of arrow 2304 towards inner mold line side 2018. This movement applies force on collar 2008 in the direction of arrow 2304.

Figure 24:
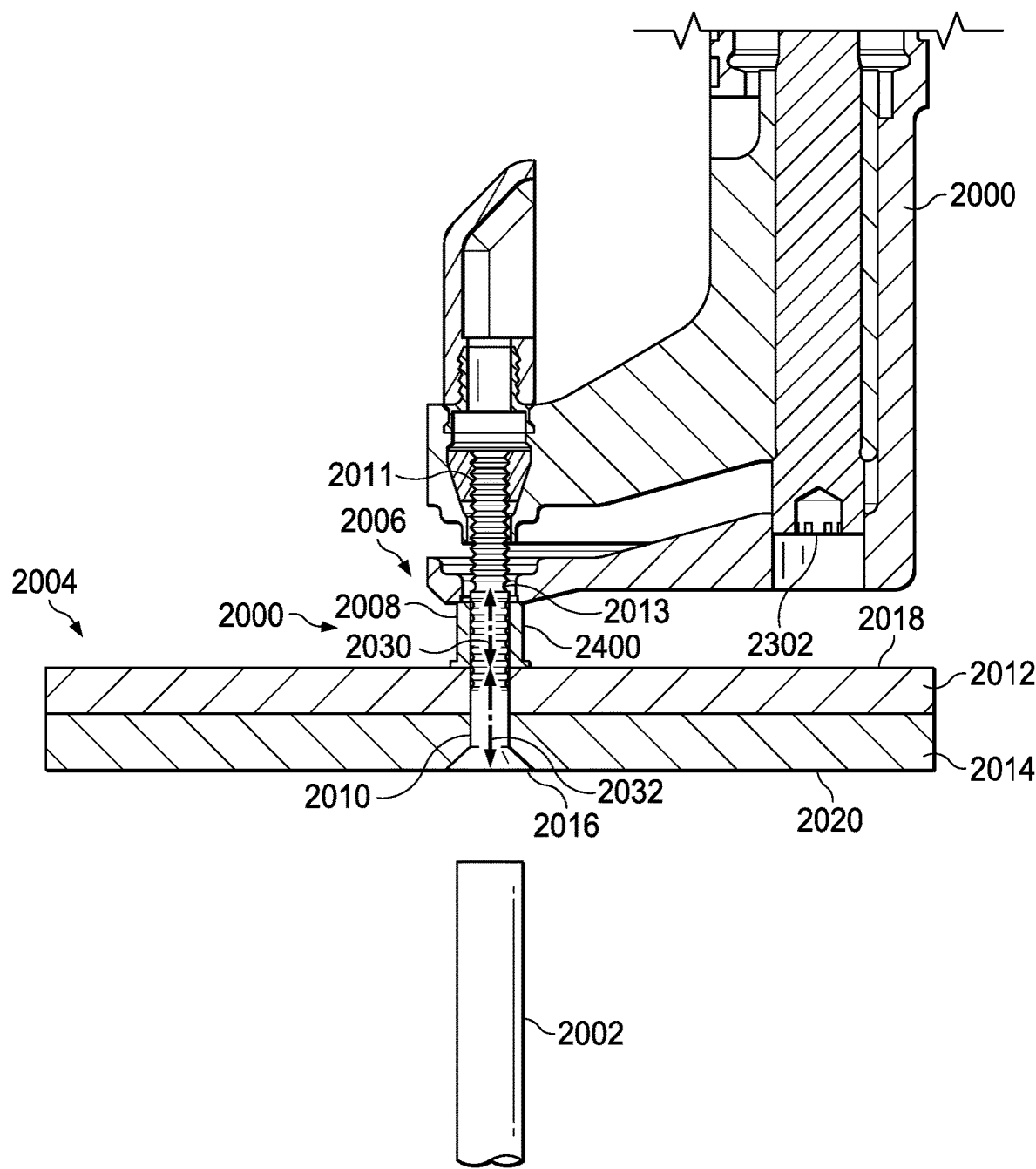

With reference to FIG. 24, an illustration of swaging collar 2008 is depicted in accordance with an illustrative embodiment. In this illustrative example, movement of collar 2008 against inner mold line side 2018 with anvil 2302 swaging collar 2008 as anvil 2302 moves over collar 2008. This force causes collar 2008 to swage in which collar 2008 deforms and engages engagement feature 2400 on pin 2010.

Figure 25:
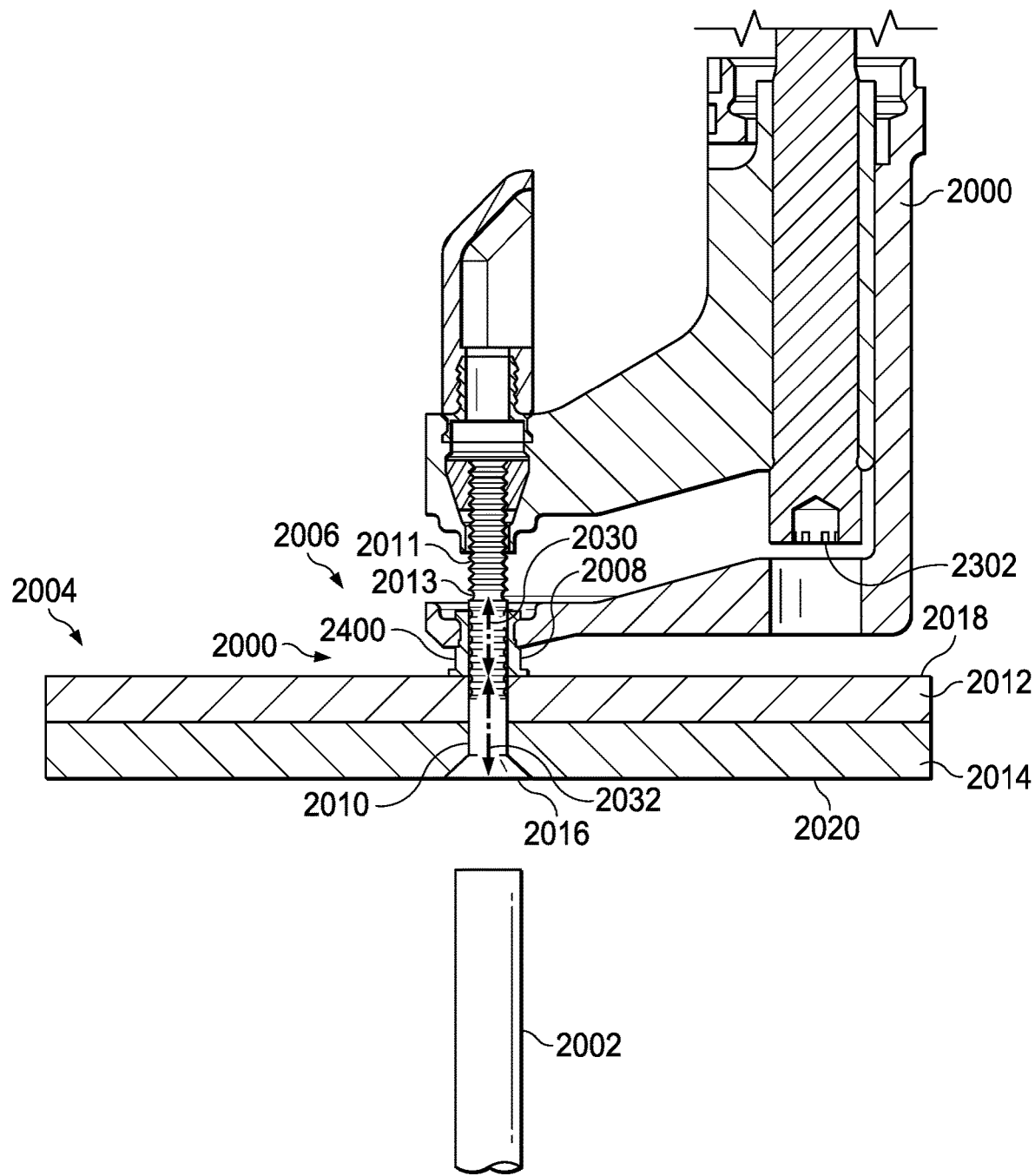

Turning to FIG. 25, an illustration of collar 2008 engaged with pin 2010 is depicted in accordance with an illustrative embodiment. In this illustrative example, anvil 2302 has fully swaged collar 2008 onto pin 2010.

Figure 26:
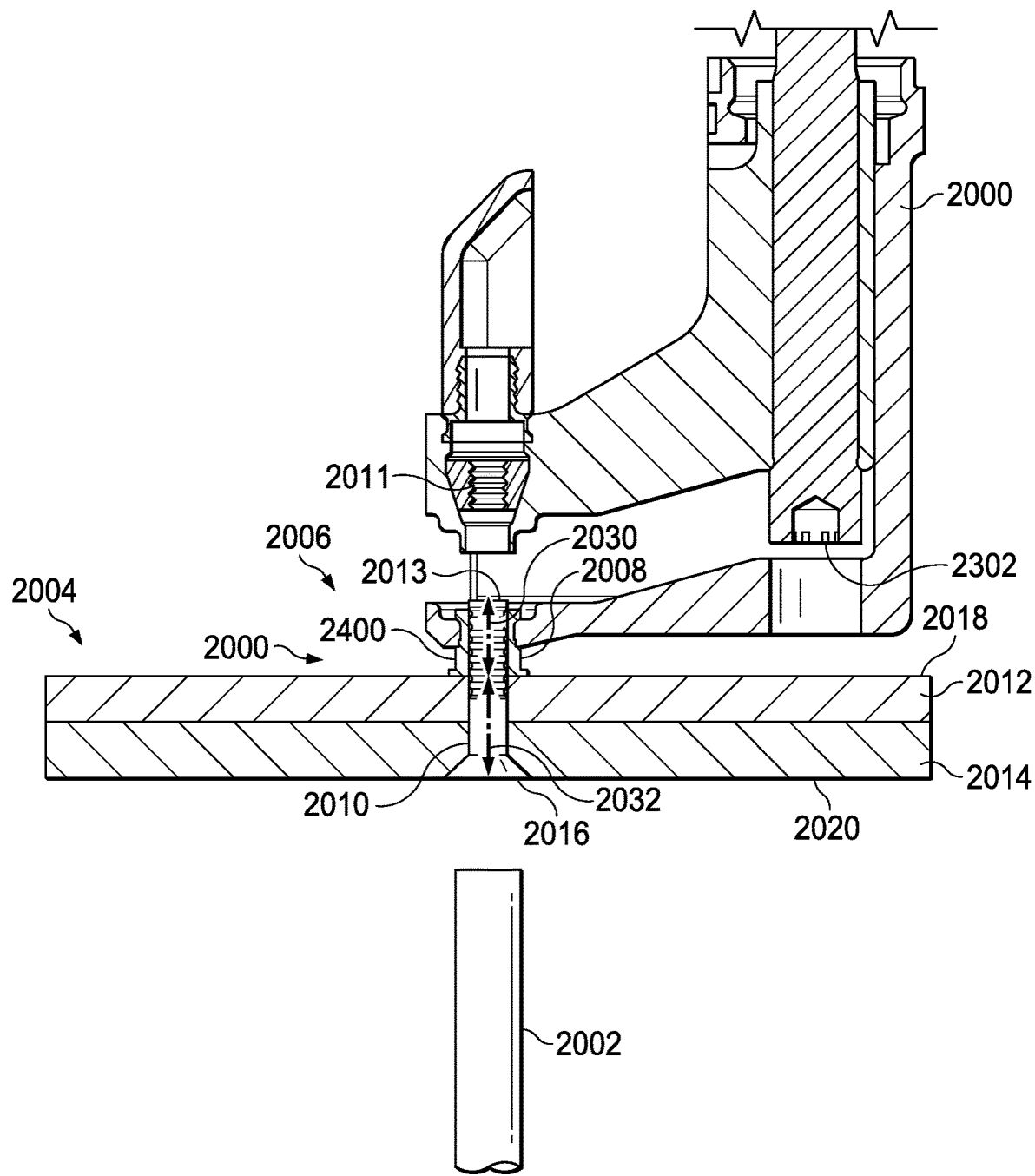

Turning now to FIG. 26, an illustration of a completed installation of fastener system 2006 is depicted in accordance with an illustrative embodiment. As can be seen in this example, pin tail 2011 (not shown) has broken off pin 2010. The engagement of collar 2008 and pin 2010 is completed in this figure.

The illustration of installing fastener system 1302 utilizing swage tool 2000 in FIGS. 20-26 is provided for illustrating one manner in which fastener system 1302 may be installed. The operations and components illustrated are not meant to limit the manner in which fastener system 2006 may be installed utilizing swage tool 2000. For example, distance 2101 between collar 2008 and inner mold line side 2018 may be substantially zero in some examples. In another illustrative example, swage tool 2000 may not be an offset swage tool as depicted in these examples.

Figure 27:
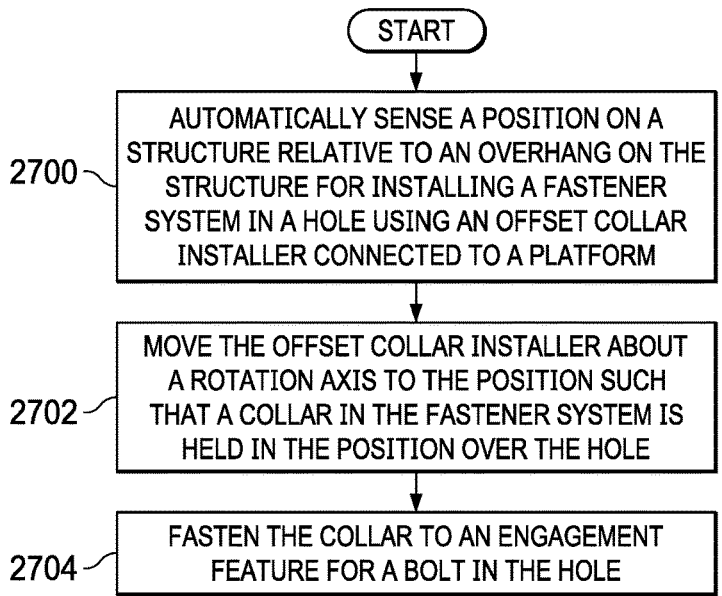
FIG. 27 is an illustration of a flowchart of a process for installing a fastener system in accordance with an illustrative embodiment.

Turning next to FIG. 27, an illustration of a flowchart of a process for installing a fastener system is depicted in accordance with an illustrative embodiment. The process illustrated in FIG. 27 can be implemented utilizing fastener installation system 120 in FIG. 1.

The process begins by automatically sensing position 126 on structure 104 relative to overhang 132 on structure 104 for installing fastener system 102 in hole 116 using offset collar installer 124 connected to platform 122 (operation 2700). The process moves offset collar installer 124 about rotation axis 128 to position 126 such that collar 110 in fastener system 102 is held in position 126 over hole 116 (operation 2702). Offset collar installer 124 is connected to platform 122 and is rotatable about rotation axis 128. As depicted, fastener system 102 can take a number different forms. For example, bolt 108 in fastener system 102 can be a bolt with threads, and collar 110 can be a nut that is rotated to engage the threads on bolt 108. In another illustrative example, bolt 108 can be a pin with a pin tail, and collar 110 can be a collar that is swaged to the pin.

The process fastens collar 110 to engagement feature 112 for bolt 108 in hole 116 (operation 2704). The process terminates thereafter.

Figure 28:
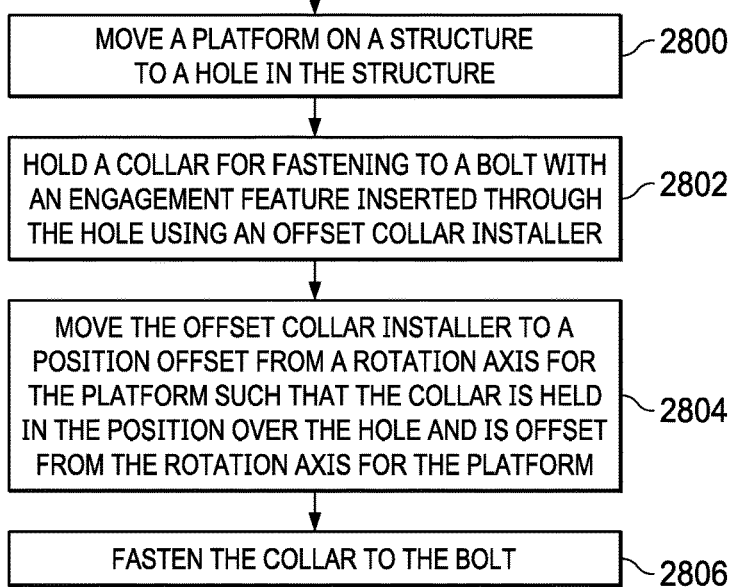
FIG. 28 is an illustration of a flowchart of a process for installing a fastener system in accordance with an illustrative embodiment.

Turning next to FIG. 28, an illustration of a flowchart of a process for installing a fastener system is depicted in accordance with an illustrative embodiment. The process illustrated in FIG. 28 can be implemented utilizing fastener installation system 120 in FIG. 1.

The process begins by moving platform 122 on structure 104 to hole 116 in structure 104 (operation 2800). The process holds collar 110 for fastening to bolt 108 with engagement feature 112 inserted through hole 116 using offset collar installer 124 (operation 2802). When bolt 108 is a pin, the process holding collar 110 for swaging to the pin with the engagement feature 112 inserted through hole 116 using collar holder 134 in offset collar installer 124 in which collar 110 is held in position 126 offset from rotation axis 128 by collar holder 134.

The process moves offset collar installer 124 to position 126 offset from rotation axis 128 such that collar 110 is held in position 126 over hole 116 and is offset from rotation axis 128 for platform 122 (operation 2804). The process fastens collar 110 to bolt 108 (operation 2806). When bolt 108 is a pin, the process swages collar 110 to the pin using a swage assembly on offset collar installer configured to swage collar 110 to engage an engagement feature on the pin. The process terminates thereafter.

Figure 29:
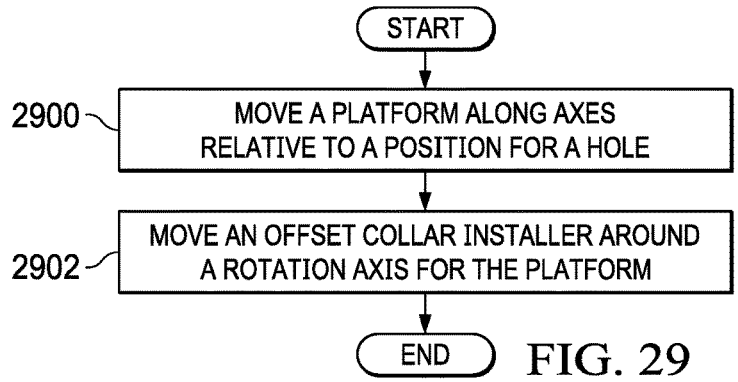
FIG. 29 is an illustration of a flowchart of a process for moving an installation system in accordance with an illustrative embodiment.

With reference to FIG. 29, an illustration of a flowchart of a process for moving an installation system is depicted in accordance with an illustrative embodiment. The process illustrated in FIG. 29 can be implemented to move fastener installation system 208 in FIG. 2. This process may be implemented utilizing movement system 138 in FIG. 1.

The process begins by moving platform 122 along axes relative to position 126 for hole 116 (operation 2900). The process moves offset collar installer 124 around rotation axis 128 (operation 2902). The movement of offset collar installer 124 may be a rotation movement about rotation axis 128 that causes offset collar installer 124 to move side-to-side of rotation axis 128. The movement in operation 2900 and operation 2902 can be used to move collar 110 to position 126 of hole 116. The process terminates thereafter.

Figure 30:
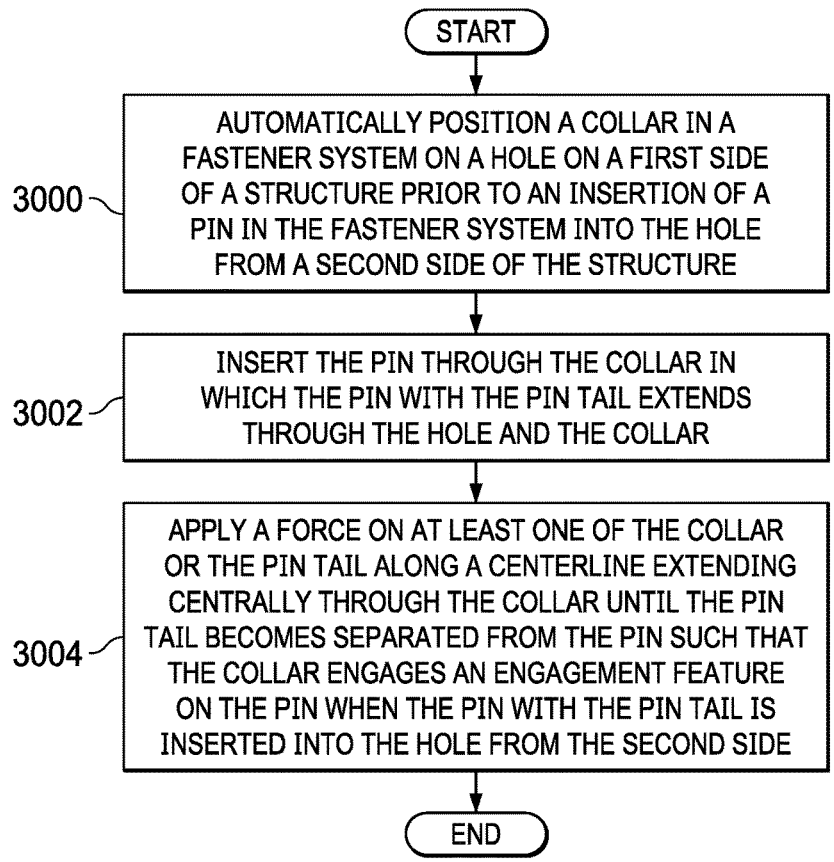
FIG. 30 is an illustration of a flowchart of a process for installing a fastener system in accordance with an illustrative embodiment.

With reference now to FIG. 30, an illustration of a flowchart of a process for installing a fastener system is depicted in accordance with an illustrative embodiment. The process illustrated in this figure can be implemented in manufacturing environment 200 to install fastener system 202 in structure 204 in FIG. 2.

The process begins by automatically positioning collar 212 in fastener installation system 208 on hole 232 on first side 256 of structure 204 prior to an insertion of pin 214 in fastener system 202 into hole 232 from second side 258 of structure 204 (operation 3000). In operation 3000, pin 214 has pin tail 218. Further, collar 212 can touch hole 232 or may be positioned a distance away from hole 232. As depicted, the distance that collar 212 can be positioned away from hole 232 may depend on the alignment of centerline 252 of hole 232 with centerline 251 of collar 212.

In operation 3000, the automatic positioning of collar 212 is performed such that collar 212 is concentrically aligned with hole 232 on first side 256 of structure 204. In operation 3000, the alignment is such that concentricity is present in collar 212 and hole 232.

The process inserts pin 214 through collar 212 in which pin 214 with pin tail 218 extends though hole 232 and collar 212 (2502). In one example in operation 3002, the process inserts pin 214 with pin tail 218 through hole 232 and collar 212 in a single motion, wherein pin 214 with pin tail 218 extends through hole 232 and collar 212. In this example, pin 214 is fully inserted such that pin 214 with pin tail 218 extends through collar 212 and collar 212 can be swaged to pin 214. In this example, pin 214 with pin tail 218 is inserted through hole 232 and collar 212 in a single motion.

In another example, in operation 3002, pin 214 can be inserted into hole 232 prior to positioning collar 212. The insertion is such that pin 214 does not interfere with positioning collar 212 with hole 232 to obtain concentricity between collar 212 and hole 232.

The process applies a force on at least one of collar 212 or pin tail 218 along centerline 251 extending centrally though collar 212 until pin tail 218 becomes separated from pin 214 such that collar 212 engages engagement feature 216 on pin 214 when pin 214 with pin tail 218 is inserted into hole 232 from second side 258 (operation 3004). The process terminates thereafter.

Figure 31:
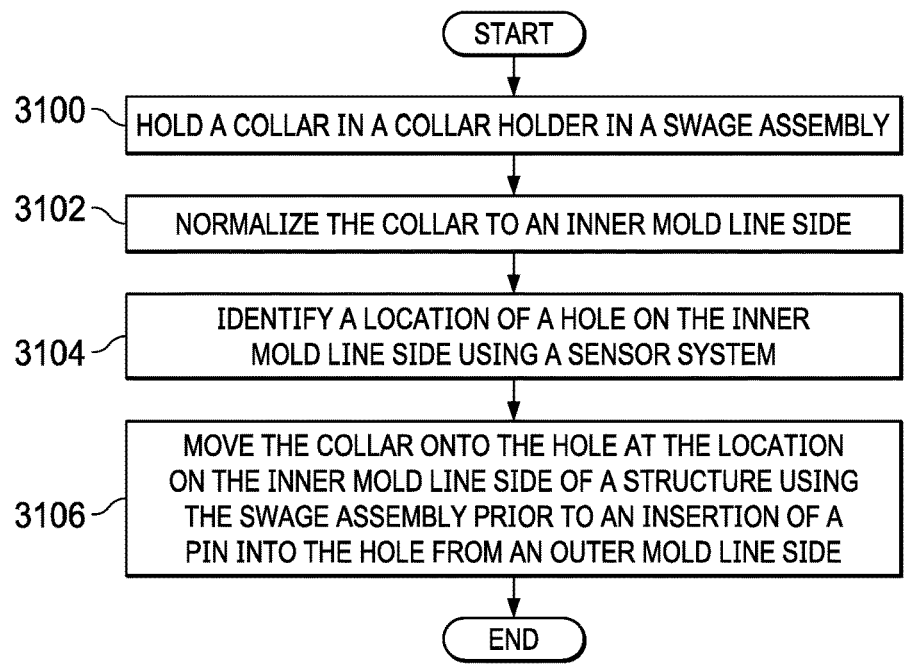
FIG. 31 is a more detailed illustration of a flowchart of a process for positioning a collar in accordance with an illustrative embodiment.

Turning next to FIG. 31, a more detailed illustration of a flowchart of a process for positioning a collar is depicted in accordance with an illustrative embodiment. The process illustrated in this figure can be implemented in manufacturing environment 200 to install fastener system 202 in structure 204 in FIG. 2.

The process holds collar 212 in collar holder 222 in swage assembly 220 (operation 3100). The process normalizes collar 212 to inner mold line side 234 (operation 3102). The process identifies location 242 of hole 232 on inner mold line side 234 using sensor system 240 (operation 3104).

The process moves collar 212 onto hole 232 at location 242 on inner mold line side 234 of structure 204 using swage assembly 220 prior to an insertion of pin 214 into hole 232 from outer mold line side 236 (operation 3106). The process terminates thereafter.

In operation 3106, collar 212 may or may not touch inner mold line side 234 when collar 212 is positioned on hole 232. In other words, a gap or distance may be present between collar 212 and the surface of the inner mold line side 234. These operations result in collar 212 being positioned on hole 232 on inner mold line side 234 of structure 204 prior to insertion of pin 214 into hole 232 from outer mold line side 236.

The process illustrated in FIG. 31 is only an example of one manner in which collar 212 can be positioned. As depicted in FIG. 31, collar 212 is positioned with respect to hole 232 prior to inserting pin 214 into hole 232. In other examples, pin 214 can be placed into hole 232 but is not moved to extend through collar 212 for engagement until collar 212 is positioned. In other words, collar 212 does not have to be positioned prior to inserting pin 214 into hole 232.

Figure 32:
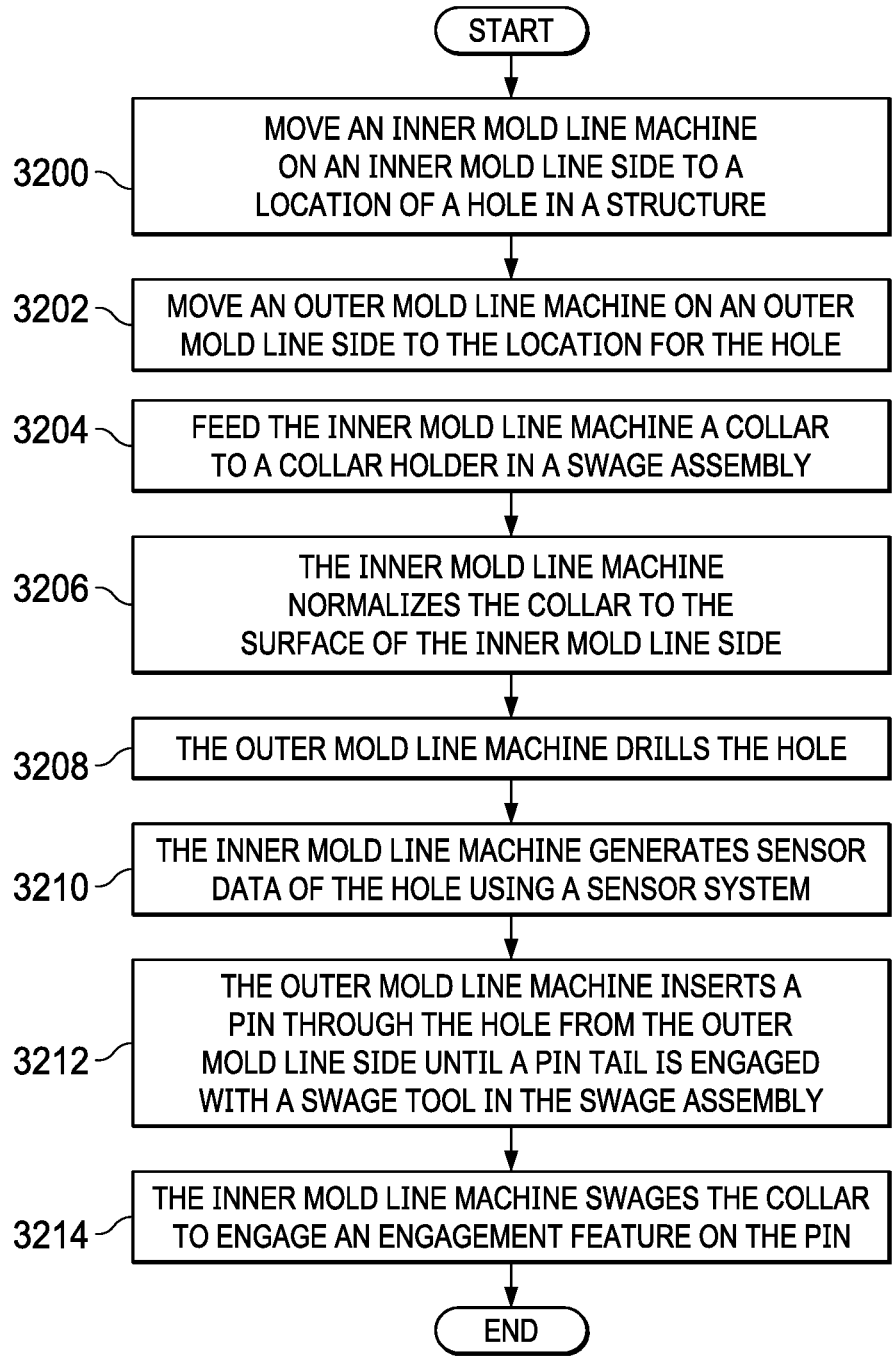
FIG. 32 is an illustration of a flowchart of a process for installing a fastener system using an inner mold line machine in an outer mold line machine in accordance with an illustrative embodiment.

With reference now to FIG. 32, an illustration of a flowchart of a process for installing a fastener system using an inner mold line machine in an outer mold line machine is depicted in accordance with an illustrative embodiment. The process illustrated in this figure may be implemented in manufacturing environment 200 in FIG. 2. The process may be implemented using inner mold line machine 244 and outer mold line machine 246 that move on tracks attached to structure 204.

The process begins with inner mold line machine 244 moving on inner mold line side 234 to location 242 of hole 232 in structure 204 (operation 3200). Outer mold line machine 246 moves on outer mold line side 236 to location for hole 232 (operation 3202). In operation 3202, hole 232 has not yet been formed. Although shown and described sequentially, operation 3200 and operation 3202 may be performed at substantially the same time.

Inner mold line machine 244 feeds collar 212 to collar holder 222 in swage assembly 220 (operation 3204). Inner mold line machine 244 normalizes collar 212 to the surface of inner mold line side 234 (operation 3206). Outer mold line machine 246 drills hole 232 (operation 3208). Inner mold line machine 244 generates sensor data 215 of hole 232 using sensor system 240 (operation 3210). Inner mold line machine 244 fine tunes positioning of collar 212 on hole 232. In operation 3210, the process aligns collar 212 with hole 232 using sensor data 215. The alignment can concentrically align collar 212 with hole 232 in this example.

Outer mold line machine 246 inserts pin 214 through hole 232 from outer mold line side 236 until pin tail 218 is engaged with swage tool 224 in swage assembly 220 (operation 3212). In operation 3212, pin tail 218 may be engaged in jaws or clamps in swage tool 224 that allows for force to be applied in pulling pin tail 218. The inner mold line machine then swages collar 212 to engage engagement feature 216 on pin 214 (operation 3214). In this illustrative example, swaging collar 212 is performed by applying a force on at least one of collar 212 or pin tail 218 along centerline 251 extending centrally though collar 212 until pin tail 218 becomes separated from pin 214 such that collar 212 engages engagement feature 216 on pin 214 when pin 214 with pin tail 218 is inserted into hole 232 from second side 258. The insertion of pin 214 with pin tail 218 can be performed such that pin 214 with pin tail 218 is inserted through hole 232 and collar 212 in a single motion.

The process terminates thereafter. This process may be performed any number of times at different locations for holes in structure 204.

This process also can be performed with inner mold line machine 244 and outer mold line machine 246 taking the form of robotic arms.

Figure 33:
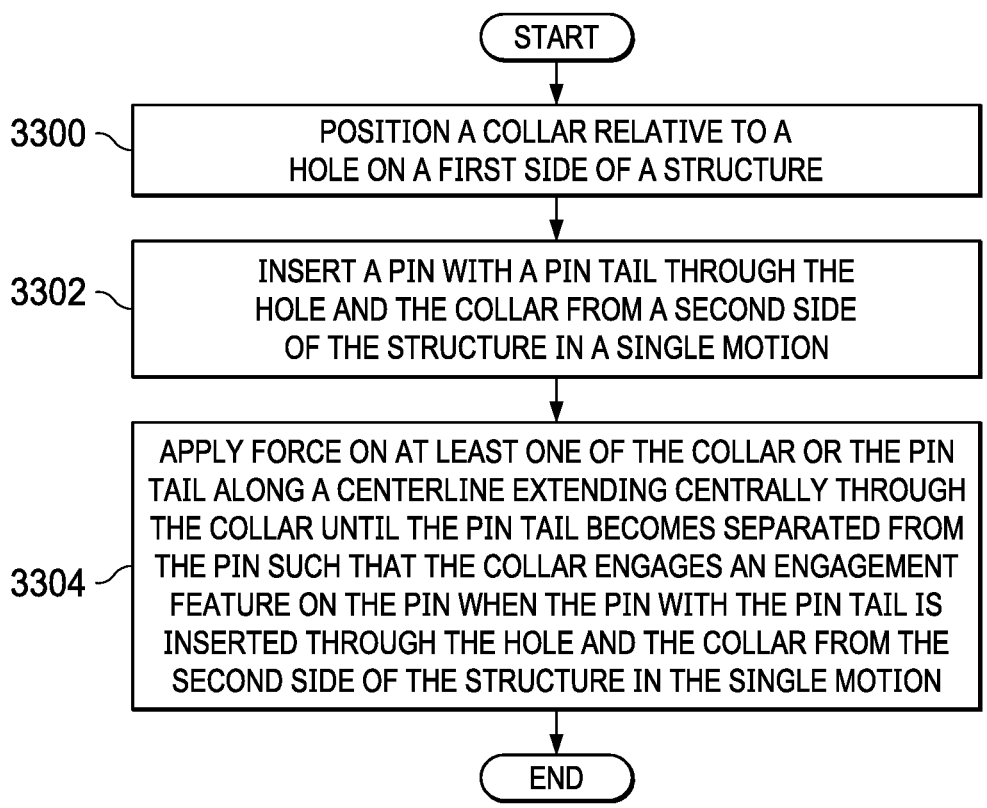
FIG. 33 is an illustration of a flowchart of a process for installing a fastener system in accordance with an illustrative embodiment.

With reference next to FIG. 33, an illustration of a flowchart of a process for installing a fastener system is depicted in accordance with an illustrative embodiment. The process illustrated in this figure can be implemented in manufacturing environment 200 to install fastener system 202 in structure 204 in FIG. 2.

The process begins by positioning collar 212 relative to hole 232 on first side 256 of structure 204 (operation 3300). The process inserts pin 214 with pin tail 218 through hole 232 and collar 212 from second side 258 of structure 204 in a single motion (operation 3302). In operation 3302, pin 214 with pin tail 218 extends through hole 232 and collar 212.

The process applies force on at least one of collar 212 or pin tail 218 along centerline 251 extending centrally though collar 212 until pin tail 218 becomes separated from pin 214 such that collar 212 engages engagement feature 216 on pin 214 when pin 214 with pin tail 218 is inserted through hole 232 and collar 212 from second side 258 of structure 204 in the single motion (operation 3304). The process terminates thereafter. In operation 3304, the process can apply force to collar 212, pin tail 218, or both collar 212 and pin tail 218 to cause engagement with engagement feature 216.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, operation 3208 in FIG. 32 may be omitted by outer mold line machine 246. Outer mold line machine 246 may insert pins without drilling holes. The different machine may form the holes in structure 204.

Figure 34:
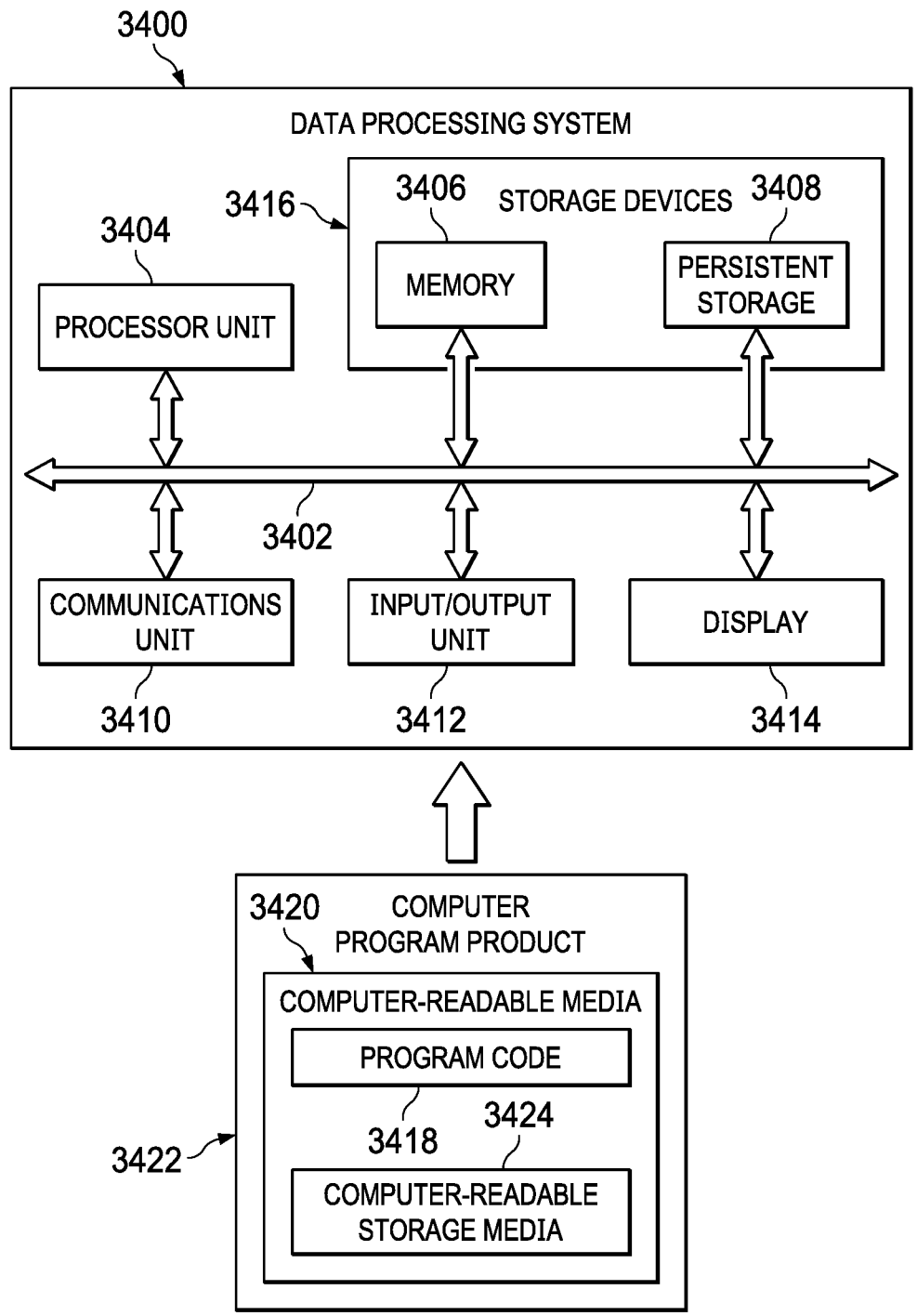
FIG. 34 is an illustration of a block diagram of a data processing system in accordance with an illustrative embodiment.

Turning now to FIG. 34, an illustration of a block diagram of a data processing system is depicted in accordance with an illustrative embodiment. Data processing system 3400 may be used to implement computer system 160 in FIG. 1 and computer system 250 in FIG. 2. In this illustrative example, data processing system 3400 includes communications framework 3402, which provides communications between processor unit 3404, memory 3406, persistent storage 3408, communications unit 3410, input/output unit 3412, and display 3414. In this example, communications framework 3402 may take the form of a bus system.

Processor unit 3404 serves to execute instructions for software that may be loaded into memory 3406. Processor unit 3404 may be a number of processors, a multi-processor core, or some other type of processor, depending on the particular implementation.

Memory 3406 and persistent storage 3408 are examples of storage devices 3416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 3416 may also be referred to as computer-readable storage devices in these illustrative examples. Memory 3406, in these examples, may be, for example, a random-access memory or any other suitable volatile or non-volatile storage device. Persistent storage 3408 may take various forms, depending on the particular implementation.

For example, persistent storage 3408 may contain one or more components or devices. For example, persistent storage 3408 may be a hard drive, a solid state hard drive, a flash memory, a rewritable optical disk, a rewritable magnetic tape, or some combination of the above. The media used by persistent storage 3408 also may be removable. For example, a removable hard drive may be used for persistent storage 3408.

Communications unit 3410, in these illustrative examples, provides for communications with other data processing systems or devices. In these illustrative examples, communications unit 3410 is a network interface card.

Input/output unit 3412 allows for input and output of data with other devices that may be connected to data processing system 3400. For example, input/output unit 3412 may provide a connection for user input through at least one of a keyboard, a mouse, or some other suitable input device. Further, input/output unit 3412 may send output to a printer. Display 3414 provides a mechanism to display information to a user.

Instructions for at least one of the operating system, applications, or programs may be located in storage devices 3416, which are in communication with processor unit 3404 through communications framework 3402. The processes of the different embodiments may be performed by processor unit 3404 using computer-implemented instructions, which may be located in a memory, such as memory 3406.

These instructions are referred to as program code, computer usable program code, or computer-readable program code that may be read and executed by a processor in processor unit 3404. The program code in the different embodiments may be embodied on different physical or computer-readable storage media, such as memory 3406 or persistent storage 3408.

Program code 3418 is located in a functional form on computer-readable media 3420 that is selectively removable and may be loaded onto or transferred to data processing system 3400 for execution by processor unit 3404. Program code 3418 and computer-readable media 3420 form computer program product 3422 in these illustrative examples. In the illustrative example, computer-readable media 3420 is computer-readable storage media 3424.

In these illustrative examples, computer-readable storage media 3424 is a physical or tangible storage device used to store program code 3418 rather than a medium that propagates or transmits program code 3418.

Alternatively, program code 3418 may be transferred to data processing system 3400 using a computer-readable signal media. The computer-readable signal media may be, for example, a propagated data signal containing program code 3418. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 3400 are not meant to provide architectural limitations to the manner in which different embodiments may be implemented. The different illustrative embodiments may be implemented in a data processing system including components in addition to or in place of those illustrated for data processing system 3400. Other components shown in FIG. 34 can be varied from the illustrative examples shown. The different embodiments may be implemented using any hardware device or system capable of running program code 3418.

Figure 35:
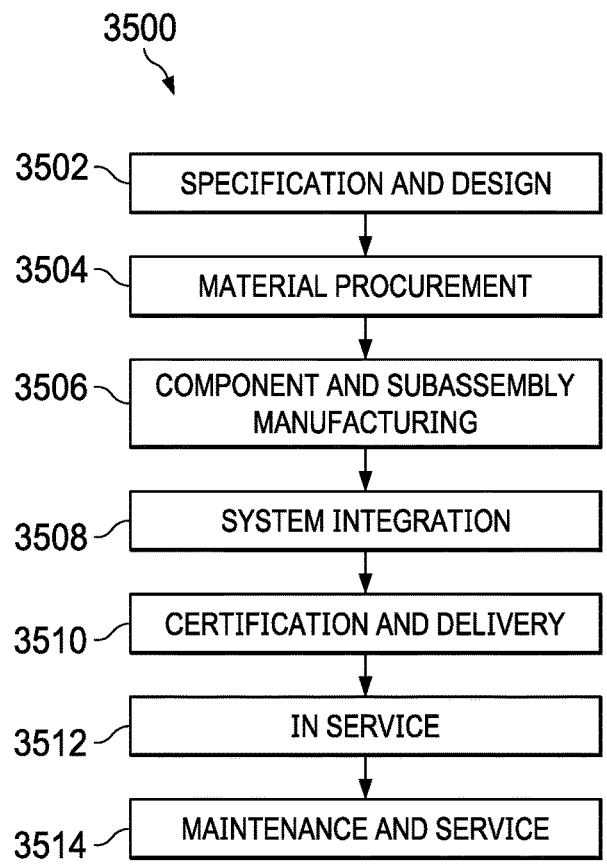
FIG. 35 is an illustration of a block diagram of an aircraft manufacturing and service method in accordance with an illustrative embodiment.
Figure 36:
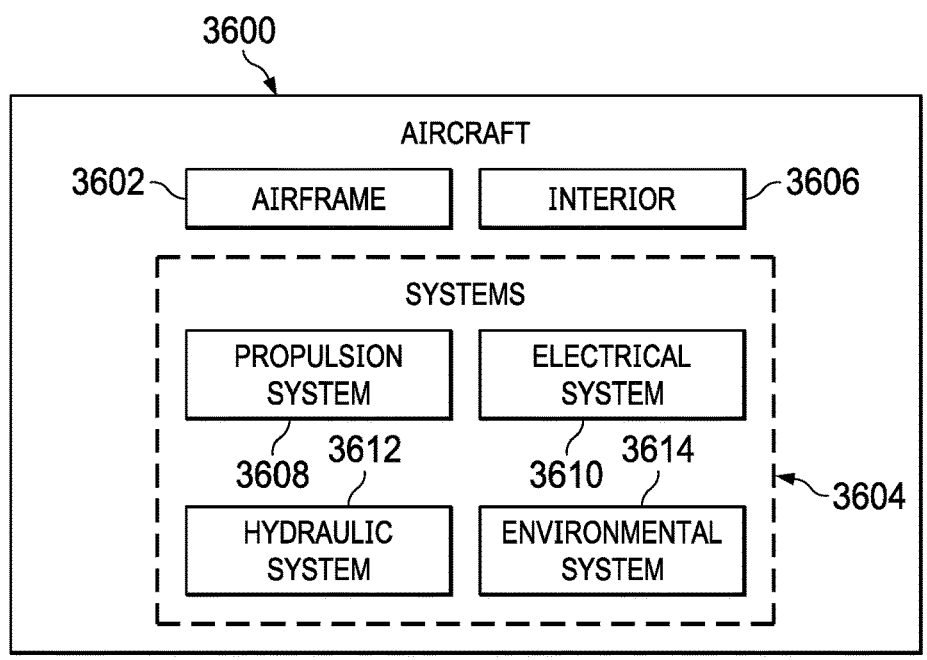
FIG. 36 is an illustration of a block diagram of an aircraft in which an illustrative embodiment may be implemented.

Illustrative embodiments of the disclosure may be described in the context of aircraft manufacturing and service method 3500 as shown in FIG. 35 and aircraft 3600 as shown in FIG. 36. Turning first to FIG. 35, an illustration of a block diagram of an aircraft manufacturing and service method is depicted in accordance with an illustrative embodiment. During pre-production, aircraft manufacturing and service method 3500 may include specification and design 3502 of aircraft 3600 in FIG. 36 and material procurement 3504.

During production, component and subassembly manufacturing 3506 and system integration 3508 of aircraft 3600 in FIG. 36 takes place. Thereafter, aircraft 3600 may go through certification and delivery 3510 in order to be placed in service 3512. While in service 3512 by a customer, aircraft 3600 is scheduled for routine maintenance and service 3514, which may include modification, reconfiguration, refurbishment, and other maintenance or service.

Each of the processes of aircraft manufacturing and service method 3500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 36, an illustration of a block diagram of an aircraft is depicted in which an illustrative embodiment may be implemented. In this example, aircraft 3600 is produced by aircraft manufacturing and service method 3500 in FIG. 35 and may include airframe 3602 with plurality of systems 3604 and interior 3606. Examples of systems 3604 include one or more of propulsion system 3608, electrical system 3610, hydraulic system 3612, and environmental system 3614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3500 in FIG. 35. As depicted, fastener installation system 120, fastener installation system 208, and the different processes described using these fastener systems can be implemented during at least one of component and subassembly manufacturing 3506, system integration 3508, or maintenance and service 3514. Further, fastener installation system 120, fastener installation system 208, and the different processes described using these fastener systems can be utilized to install fastener systems for at least one of airframe 3602 or interior 3606 for aircraft 3600.

In one illustrative example, components or subassemblies produced in component and subassembly manufacturing 3506 in FIG. 35 may be fabricated or manufactured in a manner similar to components or subassemblies produced while aircraft 3600 is in service 3512 in FIG. 35. As yet another example, one or more apparatus embodiments, method embodiments, or a combination thereof may be utilized during production stages, such as component and subassembly manufacturing 3506 and system integration 3508 in FIG. 35. One or more apparatus embodiments, method embodiments, or a combination thereof may be utilized while aircraft 3600 is in service 3512, during maintenance and service 3514 in FIG. 35, or both.

For example, at least one of fastener installation system 120 for fastener installation system 208 can operate during component and subassembly manufacturing 3506 to fasten components each other to form structures or fasten components to structures. These installation systems also may operate during maintenance and service 3514 to fasten components each other to form structures or fasten components to structures when performing at least one of routine maintenance and service 3514, which may include modification, reconfiguration, refurbishment, and other maintenance or service.

The use of a number of the different illustrative embodiments may substantially expedite the assembly of aircraft 3600, reduce the cost of aircraft 3600, or both expedite the assembly of aircraft 3600 and reduce the cost of aircraft 3600. One or more illustrative examples provide an ability to automate fastener installation with reduced labor from human operators. With the ability to automate installation of fastener systems, the manufacture and assembly of aircraft 3600 may be performed more quickly and at a lower cost.

Figure 37:
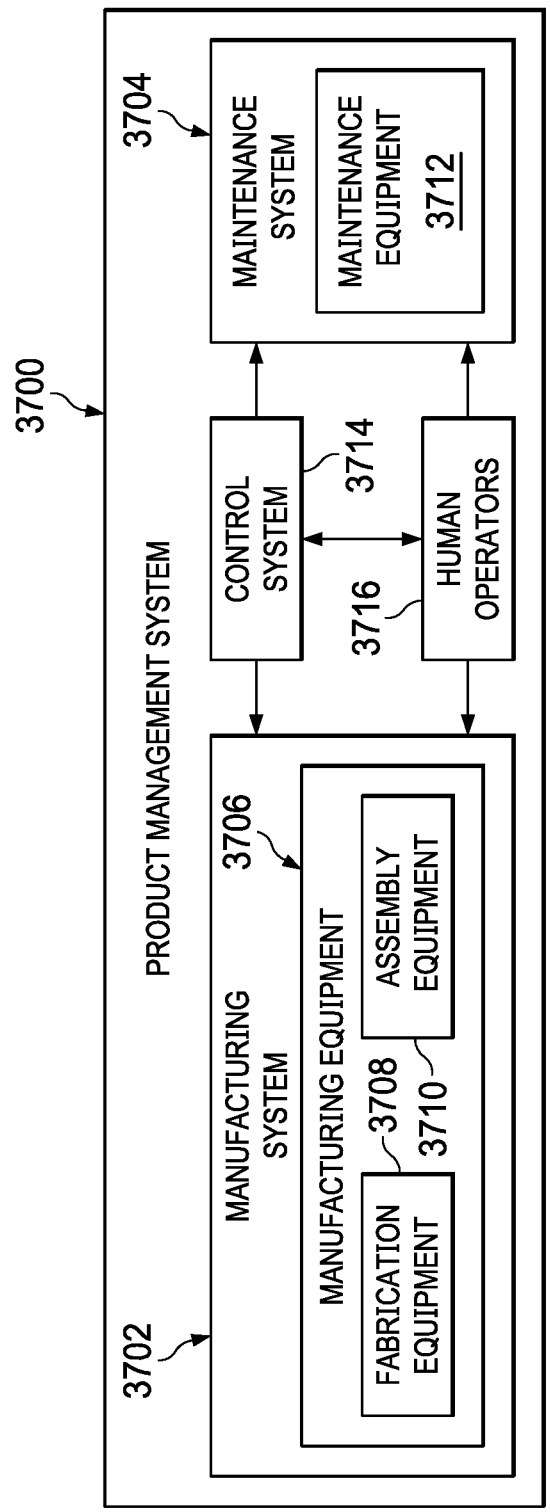
FIG. 37 is an illustration of a block diagram of a product management system in accordance with an illustrative embodiment.

Turning now to FIG. 37, an illustration of a block diagram of a product management system is depicted in accordance with an illustrative embodiment. Product management system 3700 is a physical hardware system. In this illustrative example, product management system 3700 may include at least one of manufacturing system 3702 or maintenance system 3704.

Manufacturing system 3702 is configured to manufacture products, such as aircraft 3600 in FIG. 36. As depicted, manufacturing system 3702 includes manufacturing equipment 3706. Manufacturing equipment 3706 includes at least one of fabrication equipment 3708 or assembly equipment 3710.

Fabrication equipment 3708 is equipment that may be used to fabricate components for parts used to form aircraft 3600. For example, fabrication equipment 3708 may include machines and tools. These machines and tools may be at least one of a drill, a hydraulic press, a furnace, a mold, a composite tape laying machine, a vacuum system, a lathe, or other suitable types of equipment. Fabrication equipment 3708 may be used to fabricate at least one of metal parts, composite parts, semiconductors, circuits, fasteners, ribs, skin panels, spars, antennas, or other suitable types of parts.

Assembly equipment 3710 is equipment used to assemble parts to form aircraft 3600. In particular, assembly equipment 3710 may be used to assemble components and parts to form aircraft 3600. Assembly equipment 3710 also may include machines and tools. These machines and tools may be at least one of a robotic arm, a crawler, a fastener installation system, a rail-based drilling system, or a robot. Assembly equipment 3710 may be used to assemble parts such as seats, horizontal stabilizers, wings, engines, engine housings, landing gear systems, and other parts for aircraft 3600. In the illustrative example, assembly equipment 3710 may include at least one of fastener installation system 120 in FIG. 1 or fastener installation system 208 in FIG. 2.

In this illustrative example, maintenance system 3704 includes maintenance equipment 3712. Maintenance equipment 3712 may include any equipment needed to perform maintenance on aircraft 3600. Maintenance equipment 3712 may include tools for performing different operations on parts on aircraft 3600. These operations may include at least one of disassembling parts, refurbishing parts, inspecting parts, reworking parts, manufacturing replacement parts, or other operations for performing maintenance on aircraft 3600. These operations may be for routine maintenance, inspections, upgrades, refurbishment, or other types of maintenance operations.

In the illustrative example, maintenance equipment 3712 may include ultrasonic inspection devices, x-ray imaging systems, vision systems, drills, crawlers, and other suitable device. In some cases, maintenance equipment 3712 may include fabrication equipment 3708, assembly equipment 3710, or both to produce and assemble parts that may be needed for maintenance.

Product management system 3700 also includes control system 3714. Control system 3714 is a hardware system and may also include software or other types of components. Control system 3714 is configured to control the operation of at least one of manufacturing system 3702 or maintenance system 3704. In particular, control system 3714 may control the operation of at least one of fabrication equipment 3708, assembly equipment 3710, or maintenance equipment 3712.

The hardware in control system 3714 may be using hardware that may include computers, circuits, networks, and other types of equipment. The control may take the form of direct control of manufacturing equipment 3706. For example, robots, computer-controlled machines, and other equipment may be controlled by control system 3714. In other illustrative examples, control system 3714 may manage operations performed by human operators 3716 in manufacturing or performing maintenance on aircraft 3600. For example, control system 3714 may assign tasks, provide instructions, display models, or perform other operations to manage operations performed by human operators 3716. In these illustrative examples, controller 158 in computer system 160 in FIG. 1 and controller 248 and computer system 250 in FIG. 2 may be implemented in control system 3714 to manage at least one of the manufacturing or maintenance of aircraft 3600 in FIG. 36. For example, these controllers may be implemented to automate the installation of fastener systems to manufacture aircraft 3600 or other products.

In the different illustrative examples, human operators 3716 may operate or interact with at least one of manufacturing equipment 3706, maintenance equipment 3712, or control system 3714. This interaction may be performed to manufacture aircraft 3600.

Of course, product management system 3700 may be configured to manage other products other than aircraft 3600. Although product management system 3700 has been described with respect to manufacturing in the aerospace industry, product management system 3700 may be configured to manage products for other industries. For example, product management system 3700 can be configured to manufacture products for the automotive industry as well as any other suitable industries.

Thus, the illustrative embodiments provide a method, apparatus, and system for installing fastener systems. These fastener systems can be installed in a structure that may have obstructions such as overhangs that may require human operators to install the fasteners. In an illustrative example, a portion of a platform can be fabricated using one or more of the processes illustrated in the flowcharts. For example, a portion of an aircraft can be assembled according to the method in one or more of the flowcharts in FIGS. 27-33.

Further, a method can be used to fabricate a portion of a platform using the apparatus illustrated in FIGS. 1-26. For example, a method for fabricating a portion of an aircraft can use the apparatus in FIGS. 1-26.

one illustrative example, an offset collar installer is employed as part of a fastener installation system controlled by a computer program running on a computer system to install the fasteners in locations where obstructions such as overhangs may be present. For example, an overhang may be present at a horizontal butt, a lap splice, or both at a horizontal butt and a lap splice in the interior of the fuselage corner.

In another illustrative example, a fastener installation system may position a collar on a hole through which a pin is inserted. The collar may or may not touch the surface of the structure at the hole. The positioning of the collar prior to insertion of the pin through the hole and the collar reduces the need for human operators to install the fasteners when the holes are not normal to the surface of the structure.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for installing a fastener system, the method comprising:
   automatically positioning, by an inner mold line machine, a collar of the fastener system on a hole on a first side of a structure prior to an insertion of a pin of the fastener system into the hole from a second side of the structure in which the pin has a pin tail, wherein the collar of the fastener system is positioned on the hole when the collar is concentrically aligned with the hole on the first side of the structure, wherein positioning the collar of the fastener system on the hole on the first side of the structure prior to the insertion of the pin of the fastener system into the hole enables installing the collar on the pin in the hole when the hole deviates from normal with respect to a surface of the structure, automatically positioning the collar of the fastener system on the hole on the first side of the structure comprising:
   holding the collar in a collar holder in a swage assembly of the inner mold line machine;
   identifying a location of the hole on the first side using a sensor system of the inner mold line machine; and
   moving the swage assembly such that the collar held by the collar holder is positioned on the hole on the first side of the structure prior to the insertion of the pin with the pin tail into the hole from the second side;

inserting the pin with the pin tail through the collar, by an outer mold line machine, in which the pin extends through the hole and the collar, wherein the outer mold line machine is moveable across the second side of the structure independently of the inner mold line machine; and applying a force on at least one of the collar or the pin tail along a centerline extending centrally though the collar until the pin tail becomes separated from the pin such that the collar engages an engagement feature on the pin when the pin with pin tail is inserted into the hole from the second side.

2. The method of claim 1, wherein the inserting step comprises:
inserting the pin with the pin tail through the hole and the collar in a single motion, wherein the pin extends through the hole and the collar.

3. The method of claim 1, wherein automatically positioning the collar on the hole on the first side of the structure prior to the insertion of the pin into the hole from the second side further comprises:
normalizing the collar to the first side by positioning the collar with the swage assembly.

4. The method of claim 1 wherein the sensor system includes a camera system and a laser range finder.

5. The method of claim 1 further comprising:
inserting the pin with the pin tail into the hole from the second side after the collar is positioned on the hole on the first side of the structure.

6. The method of claim 1, wherein the swage assembly is an offset swage assembly such that the collar holder is offset from a rotation axis of the inner mold line machine.

7. The method of claim 1, wherein the first side is an inner mold line side and the automatically positioning step and the applying step are performed by a swage assembly for an inner mold line machine.

8. The method of claim 7, wherein the inner mold line machine is selected from a group comprising a flex track crawler and a robotic arm.

9. The method of claim 1, wherein the structure is selected from a group comprising a metal structure, a composite structure, a metal and composite work piece, a splice, a butt splice, and a splice for two fuselage sections.

10. The method of claim 1 further comprising:
drilling the hole into the structure by the outer mold line machine through the second side.

11. The method of claim 1 further comprising:
removing debris from around the hole by a vacuum system of the inner mold line machine.

12. The method of claim 11 further comprising:
moving the vacuum system away from the hole such that a sensor of the sensor system has a line of sight to the hole.

13. The method of claim 12 further comprising:
maintaining the sensor in a stationary elevation within the inner mold line machine.

14. The method of claim 1 further comprising:
detecting a distance from a laser sensor of the sensor system to the first side; and
generating an image of the hole using a camera of the sensor system.

15. The method of claim 14, wherein the camera maintains a greater distance from the first side than a distance of the collar holder to the first side during all operations of the inner mold line machine including while generating the image and during automatically positioning the collar of the fastener system on the hole.

16. The method of claim 1 further comprising:
rotating the swage assembly within the inner mold line machine to position the swage assembly over the hole.

17. The method of claim 1 further comprising:
removing the pin tail using a vacuum system of the inner mold line machine after the pin tail becomes separated from the pin.

18. A method for installing a fastener system, the method comprising:
drilling a hole into a structure through a second side of the structure by an outer mold line machine;
removing debris from around the hole by a vacuum system of an inner mold line machine;
automatically positioning, by the inner mold line machine, a collar of the fastener system on a hole on a first side of a structure prior to an insertion of a pin of the fastener system into the hole from a second side of the structure in which the pin has a pin tail, wherein the collar of the fastener system is positioned on the hole when the collar is concentrically aligned with the hole on the first side of the structure, wherein positioning the collar of the fastener system on the hole on the first side of the structure prior to the insertion of the pin of the fastener system into the hole enables installing the collar on the pin in the hole when the hole deviates from normal with respect to a surface of the structure, automatically positioning the collar of the fastener system on the hole on the first side of the structure comprising:
holding the collar in a collar holder in a swage assembly of the inner mold line machine;
identifying a location of the hole on the first side using a sensor system of the inner mold line machine; and
moving the swage assembly such that the collar held by the collar holder is positioned on the hole on the first side of the structure prior to the insertion of the pin with the pin tail into the hole from the second side;
inserting the pin with the pin tail through the collar, by the outer mold line machine, in which the pin extends through the hole and the collar, wherein the outer mold line machine is moveable across the second side of the structure independently of the inner mold line machine; and
applying a force on at least one of the collar or the pin tail along a centerline extending centrally through the collar until the pin tail becomes separated from the pin such that the collar engages an engagement feature on the pin when the pin with pin tail is inserted into the hole from the second side.

19. The method of claim 18 further comprising:
removing the pin tail using the vacuum system of the inner mold line machine after the pin tail becomes separated from the pin.

20. The method of claim 18, wherein the inserting step comprises:
inserting the pin with the pin tail through the hole and the collar in a single motion, wherein the pin extends through the hole and the collar.

* * * * *